US012002067B2

(12) United States Patent
Kadaster et al.

(10) Patent No.: US 12,002,067 B2
(45) Date of Patent: Jun. 4, 2024

(54) COMPUTER SYSTEM FOR PROVIDING PAYMENTS, INCENTIVES, AND FRAUD PROTECTION WITHIN OR ACROSS INDUSTRIES

(71) Applicant: BUY IT MOBILITY NETWORKS INC., Roswell, GA (US)

(72) Inventors: Aydin A. Kadaster, New York, NY (US); Adam Frisch, Sands Point, NY (US); S. Jermaine Johnston, Denver, CO (US); Donald Krasnosky, Nashville, TN (US)

(73) Assignee: BUY IT MOBILITY NETWORKS INC., Roswell, GA (US)

( * ) Notice: Subject to any disclaimer, the term of this patent is extended or adjusted under 35 U.S.C. 154(b) by 0 days.

(21) Appl. No.: 17/880,908

(22) Filed: Aug. 4, 2022

(65) Prior Publication Data

US 2022/0374932 A1 Nov. 24, 2022

Related U.S. Application Data

(62) Division of application No. 16/668,607, filed on Oct. 30, 2019, now Pat. No. 11,429,999.
(Continued)

(51) Int. Cl.
*G06Q 30/02* (2023.01)
*G06Q 20/40* (2012.01)
(Continued)

(52) U.S. Cl.
CPC ..... *G06Q 30/0236* (2013.01); *G06Q 20/4016* (2013.01); *G06Q 30/0255* (2013.01);
(Continued)

(58) Field of Classification Search
CPC .......... G06Q 30/0236; G06Q 30/0255; G06Q 20/4016; H04L 9/0637
See application file for complete search history.

(56) References Cited

U.S. PATENT DOCUMENTS 9,852,427 B2 12/2017 Caldera
9,928,290 B2 3/2018 Tiell
(Continued)

FOREIGN PATENT DOCUMENTS

CN 107038642 A 8/2017
CN 107146101 9/2017
(Continued)

OTHER PUBLICATIONS

Deloitte, Making Blockchain Real for Customer Loyalty Rewards Programs, Deloitte Center for Financial Services, 2016, 19 pages, Retrieved from https://www2.deloitte.com/us/en/pages/financial-services/articles/making-blockchain-real-customer-loyalty-rewards-programs.html.

*Primary Examiner* — Scott C Anderson
(74) *Attorney, Agent, or Firm* — Foley & Lardner LLP

(57) ABSTRACT

A network includes a platform provider having a centralized operating environment including a combination of hardware, software, and a communication device configured to receive information from a plurality of enterprise networks each configured to independently communicate information to the platform provider. The information includes customer information, device information, requested enrollment or application information, requested transaction information, completed enrollment or application information, or completed transaction information, or a combination thereof. The platform provider is configured to validate and record the information in a secure ledger. The platform provider is further configured to, based on the information, identify incentives, advertisements, or other communications to pro-
(Continued)

vide a customer, deliver incentives, advertisements, or other communications to a customer, calculate a fee owed by one enterprise network to one of the platform provider, another enterprise network, or a customer, or assess a probability that a requested consumer, device, enrollment, application, or transaction is fraudulent.

10 Claims, 9 Drawing Sheets

Related U.S. Application Data

(60) Provisional application No. 62/753,334, filed on Oct. 31, 2018.

(51) Int. Cl.
  *G06Q 30/0207* (2023.01)
  *G06Q 30/0251* (2023.01)
  *H04L 9/06* (2006.01)
  *H04L 9/00* (2022.01)

(52) U.S. Cl.
  CPC .............. *H04L 9/0637* (2013.01); *H04L 9/50* (2022.05); *H04L 2209/56* (2013.01)

(56) References Cited

U.S. PATENT DOCUMENTS

| | | |
|---|---|---|
| 2009/0157507 A1 | 6/2009 | Agius et al. |
| 2012/0323662 A1 | 12/2012 | Otto et al. |
| 2014/0143143 A1 | 5/2014 | Fasoli et al. |
| 2014/0372319 A1 | 12/2014 | Wolovitz |
| 2015/0149284 A1 | 5/2015 | Williams et al. |
| 2015/0245084 A1 | 8/2015 | Downing et al. |
| 2015/0363777 A1 | 12/2015 | Ronca et al. |
| 2016/0012424 A1 | 1/2016 | Simon et al. |
| 2016/0217532 A1 | 7/2016 | Slavin |
| 2016/0300227 A1 | 10/2016 | Subhedar et al. |
| 2016/0321642 A1* | 11/2016 | Kaufman ................ H04W 8/14 |
| 2016/0342994 A1 | 11/2016 | Davis |
| 2017/0046792 A1 | 2/2017 | Haldenby et al. |
| 2017/0132626 A1 | 5/2017 | Kennedy |
| 2017/0169363 A1 | 6/2017 | Salmasi et al. |
| 2017/0228841 A1 | 8/2017 | Howie |
| 2017/0243241 A1 | 8/2017 | Boutelle et al. |
| 2017/0295232 A1 | 10/2017 | Curtis |
| 2017/0300876 A1 | 10/2017 | Musiala et al. |
| 2017/0308926 A1 | 10/2017 | Wofford et al. |
| 2017/0330217 A1 | 11/2017 | Postrel |
| 2018/0005243 A1* | 1/2018 | Zovi .................... G06Q 20/405 |
| 2018/0040040 A1 | 2/2018 | Barski et al. |
| 2018/0053161 A1 | 2/2018 | Bordash et al. |
| 2018/0075453 A1 | 3/2018 | Durvasula et al. |
| 2018/0096175 A1 | 4/2018 | Schmeling et al. |
| 2018/0103042 A1 | 4/2018 | Castagna et al. |
| 2018/0137503 A1 | 5/2018 | High et al. |
| 2018/0144340 A1 | 5/2018 | Kinnaird et al. |
| 2018/0165758 A1 | 6/2018 | Saxena et al. |
| 2018/0174188 A1* | 6/2018 | Wilkinson ......... G06Q 30/0242 |
| 2018/0189781 A1 | 7/2018 | Mccann et al. |
| 2018/0315051 A1* | 11/2018 | Hurley .............. G06Q 20/3255 |
| 2019/0327259 A1 | 10/2019 | Defelice |

FOREIGN PATENT DOCUMENTS

| | | |
|---|---|---|
| CN | 107194281 A | 9/2017 |
| KR | 101814989 B1 | 1/2018 |
| WO | WO-2017/136956 A1 | 8/2017 |

* cited by examiner

COMPUTER SYSTEM FOR PROVIDING PAYMENTS, INCENTIVES, AND FRAUD PROTECTION WITHIN OR ACROSS INDUSTRIES

CROSS-REFERENCE TO RELATED APPLICATIONS

This application is a divisional application of U.S. patent application Ser. No. 16/668,607, filed Oct. 30, 2019, which claims the benefit of, and priority to, U.S. Provisional Patent Application No. 62/753,334, both entitled COMPUTER SYSTEM FOR PROVIDING PAYMENTS, INCENTIVES, AND FRAUD PROTECTION WITHIN OR ACROSS INDUSTRIES, filed Oct. 31, 2018, each of which is incorporated herein by reference in its entirety.

BACKGROUND

1. Technical Field

The present application relates to computerized systems and methods for providing payments, incentives and/or fraud protection.

2. Description of Related Art

Certain conventional systems require enterprise networks to communicate with each other directly. It can be difficult to manage such communication, especially when the enterprise networks differ from each other (e.g. are designed for different industries, or are configured to meet different standards). Furthermore, tracking communications and transactions between such enterprise networks can be challenging.

SUMMARY

In some embodiments, a network includes a platform provider having a centralized operating environment including a combination of hardware, software, and at least one communication device configured to receive information from a plurality of enterprise networks each configured to independently communicate information to the platform provider. The information includes customer and/or device information, requested enrollment and/or application information, completed enrollment and/or application information, requested transaction information, or completed transaction information, or a combination thereof. The platform provider is configured to validate and record the information in a secure ledger, and based on the information, the platform provider is further configured to: identify incentives, advertisements, or other communications to provide a customer; calculate a fee owed by one enterprise network or customer to one of the platform provider or another enterprise network, or another customer; assess a probability that a device, consumer, enrollment, application, or transaction is fraudulent, suspicious, or includes other attributes that may be tracked by the platform provider (e.g., a likelihood for a payment to bounce, a likelihood of a customer to pay, a likelihood of a customer to return the good/service, etc.); deliver or facilitate delivery of incentives, advertisements or other communications to customers within and/or across industries/enterprise networks; or deliver or facilitate delivery of payment or other transactions within and/or across industries/enterprise networks. The probability may be, for example, a score, a decision, a response, an assessment, etc.

In some aspects, the secure ledger comprises a private blockchain.

In some aspects, at least one of the enterprise networks is in a different industry than another enterprise network in the network.

In some aspects, the platform provider is configured to, based on the information, identify incentives, advertisements, or other communications to provide the customer, and validate and record the incentives provided to the customer in the secure ledger. The incentives include, for example, loyalty points, a reward, a coupon, a payment, an advertisement, a marketing communication, a discount, FIAT currency, digital currency, other form of compensation, an aggregate of a plurality of discounts from one or more of the enterprise networks, or any other suitable incentive or communication.

In some aspects, the information includes attempted or completed enrollment, application, or transaction information. The transaction information includes information related to a good or service purchased, or attempted to be purchased, information related to an enrollment or application, or request for an enrollment or application, or information related to viewing a good or service.

In some aspects, the platform provider is configured to, based on the information, identify incentives, advertisements, or other communications to provide the customer. The platform provider is further configured to receive information regarding whether providing the incentives or the advertisements or the communications to the customer resulted in the customer taking a predetermined action in order to assess or to generate an assessment of an effectiveness of providing the incentives or the advertisements or the communications to the customer.

In some aspects, the platform provider assesses or generates an assessment of the effectiveness of providing the incentives or the advertisements or the communications to the customer using artificial intelligence and/or machine learning and/or other algorithms.

In some embodiments, a method of providing incentives or fraud protection includes providing a network including a platform provider comprising a centralized operating environment including a combination of hardware, software, and at least one communication device configured to receive information from a plurality of enterprise networks each configured to independently communicate information to the platform provider; receiving, at the platform provider, information from at least one of the enterprise networks, wherein the information comprises customer identification and/or device information, requested enrollment and/or application information, completed enrollment and/or application information, requested transaction information, or completed transaction information, or a combination thereof; validating and recording the information in a secure ledger; and based on the information, performing at least one of the following steps: identifying incentives or advertisements or other communications to provide a customer, calculating a fee owed by one enterprise network or customer to one of the platform provider or another enterprise network or a customer, or assessing a probability that a requested device, consumer, enrollment, application, or transaction is fraudulent, suspicious, or includes other attributes that may be tracked by the platform provider. The probability may be, for example, a score, a decision, a response, an assessment, etc.

In some aspects of the method, the secure ledger comprises a private blockchain.

In some aspects of the method, at least one of the enterprise networks is in a different industry than another enterprise network in the network.

In some aspects of the method, based on the information, the platform provider identifies incentives advertisements, or other communications to provide the customer, and validates and records the incentives provided to the customer in the secure ledger. The incentives include, for example, loyalty points, a reward, a coupon, a payment, an advertisement, a marketing communication, a discount, FIAT currency, digital currency, other form of compensation, an aggregate of a plurality of discounts from one or more of the enterprise networks, or any other suitable incentive.

In some aspects of the method, the information includes attempted or completed enrollment, application, or transaction information. The transaction information includes information related to a good or service purchased, or attempted to be purchased, information related to an enrollment or application, or request for an enrollment or application, or information related to viewing a good or service.

In some aspects of the method, based on the information, the platform provider identifies incentives, advertisements, or other communications to provide the customer, the platform provider receives information regarding whether providing the incentives or the advertisements or the communications to the customer resulted in the customer taking a predetermined action, and the platform provider assesses or generates an assessment of an effectiveness of providing the incentives or the advertisements or the communications to the customer.

In some aspects of the method, the platform provider assesses or generates the assessment of the effectiveness of providing the incentives or the advertisements or the communications to the customer using artificial intelligence and/or machine learning and/or other algorithms.

In some embodiments, a method of providing incentives includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information from at least one of the enterprise networks, wherein the information comprises requested transaction information; identifying an aggregate discount for which a customer is eligible for based on the requested transaction information, the aggregate discount comprising at least one discount provided by at least one of the enterprise networks; providing the customer with the aggregate discount such that a total amount of a requested transaction may be reduced by an amount of the aggregate discount at the time of the transaction or at the time of a subsequent transaction; and recording the information and the aggregate discount in a secure ledger. The aggregate discount may be provided in the form of a rebate, a coupon, a credit, or other discount to be used on a future transaction. In some examples, the customer may have the option to save or otherwise accumulate the aggregate discount from each of a plurality of transactions, and combine the aggregate discounts for use in a single, future transaction.

In some embodiments, a method of providing incentives includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information from a first enterprise network regarding a purchase made using a mobile application or other interface provided by a second enterprise network; receiving, at the platform provider, information from the first enterprise network regarding a purchase made using a mobile application or other interface provided by a third enterprise network; calculating a fee owed by one enterprise network to one of the platform provider, the second enterprise network or the third enterprise network based on the information received from the first enterprise network; and recording the information and the calculated fee in a secure ledger. In some examples, the other interface may include, but is not limited to, a browser on a computer, laptop, tablet, cellular phone or other communication device; a computer interface; a software application on a device that is not a mobile device; etc.

In some embodiments, a method of providing incentives includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information from a first enterprise network regarding a purchase made using a mobile application or other interface provided by a second enterprise network; receiving, at the platform provider, information from a third enterprise network regarding a purchase made using a mobile application or other interface provided by the second enterprise network; calculating a fee owed by one enterprise network to one of the platform provider or the second enterprise network based on the information received from the first enterprise network and the third enterprise network; and recording the information and the calculated fee in a secure ledger. In some examples, the other interface may include, but is not limited to, a browser on a computer, laptop, tablet, cellular phone or other communication device; a computer interface; a software application on a device that is not a mobile device; etc.

In some embodiments, a method of providing incentives includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information regarding a first purchase from a first enterprise network and a second purchase from a second enterprise network, the first enterprise network and the second enterprise network belonging to one or more industries (e.g., the same industry or at least two different industries); recording the information in a secure ledger; calculating a reward earned by a customer based on the first purchase and a reward earned by a customer based on the second purchase; recording the rewards in the secure ledger; receiving, at the platform provider, redemption information indicating that the customer used the reward at either the first enterprise network, the second enterprise network, or a third enterprise network; and recording the redemption information in the secure ledger to allow the first enterprise network, the second enterprise network, or the third enterprise network to reconcile a respective position based on the secure ledger.

In some embodiments, a method of providing fraud protection includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information regarding an enrollment request or a transaction request, the information including transaction information comprising location, amount, time, and/or customer information comprising a name, address, telephone number, credit card number, payment account number, social security number, driver's license or state identification number, IP address, SIM number, loyalty account information, credit history, past enrollment or transaction history and/or bank account number associated with the enrollment request or the transaction request; assessing a probability, based on past behavior associated with the customer information, that the enrollment request or the transaction request is fraudulent, suspicious or includes other attributes that may be tracked by the platform provider; and recording the information and the probability in a secure ledger. In some aspects, the method of providing fraud protection assessing the probability is performed using artificial intelligence or machine learning and/or other algorithms. The probability may be, for example, a score, a decision, a response, an assessment, etc.

In some aspects, the method of providing fraud protection further includes providing at least one enterprise network with the probability, or score, decision, or other response based on an assessment, that the enrollment request or the transaction request is fraudulent, suspicious, or includes other attributes that may be tracked by the platform provider.

In some aspects, the method of providing fraud protection further includes receiving additional information from the at least one enterprise network that the enrollment request or the transaction request is fraudulent, suspicious, or includes other attributes that may be tracked by the platform provider; and recording the additional information in the secure ledger. The additional information may be received in real-time or may be subsequently received (e.g., the enrollment request or the transaction was subsequently found to be fraudulent, suspicious, or include other attributes). Additional information may be provided, for example, by an enterprise network, a credit agency, or the customer. The additional information received in real-time or subsequent to the enrollment request or transaction may be used by the platform provider to inform decision making algorithms in future assessments/decisions.

In some embodiments, a method of providing incentives includes providing a network including a platform provider comprising a centralized operating environment including a combination of hardware, software, and at least one communication device configured to receive information from a plurality of enterprise networks belonging to one or more industries (e.g., the same industry or at least two different industries), each enterprise network configured to independently communicate information to the platform provider; receiving, at the platform provider, information regarding customer behavior, the information including social media activity, articles and/or advertisements viewed, webpages visited, apps downloaded or used, goods or services viewed or purchased, location, places visited, demographics, or a combination thereof; assessing a probability, based on the information, that showing a targeted advertisement or other communication to a customer will result in the customer taking a predetermined action; and recording the information and the probability in a secure ledger. In some aspects, the method of providing incentives, assessing the probability is performed using artificial intelligence or machine learning. The probability may be, for example, a score, a decision, a response, an assessment, etc.

In some aspects, the method of providing incentives further includes providing a customer network with the targeted advertisement or other communication.

In some aspects, the method of providing incentives further includes providing at least one enterprise network with the probability that showing a targeted advertisement or other communication to a customer will result in the customer taking a predetermined action.

In some aspects, the method of providing incentives further includes receiving action information from the at least one enterprise network that the targeted advertisement or other communication resulted in the customer taking the predetermined action; and recording the action information in the secure ledger. The action information may be received in real-time or subsequent to the customer taking the predetermined action. The action information may be used by the platform provider to inform decision making algorithms in future assessments/decisions.

In some embodiments, a network includes a platform provider comprising a centralized operating environment including a combination of hardware, software, and at least one communication device configured to receive information from a plurality of enterprise networks each configured to independently communicate information to the platform provider. The information comprises enrollment information for a loyalty program for a party, the enrollment information comprising at least one of: customer information comprising a name, an address, a telephone number, a credit card number, a payment account number, a social security number, a driver's license or state identification number, an internet protocol (IP) address, a subscriber identification module (SIM) number, loyalty account information, at least a portion of a credit history, at least a portion of a past enrollment or transaction history, or a bank account number. The platform provider is configured to: maintain a secure ledger; receive a verification request from one of the enterprise networks; determine, responsive to receiving the verification request, an assessment for the party using the enrollment information, the assessment indicating that the party is non-fraudulently enrolled in the loyalty program; record the assessment for the party in the secure ledger; provide an indication of the assessment to the one of the enterprise networks; receive, from the one of the enterprise networks, a request to remediate a position of the party relative to the enterprise network, the position of the party relative to the enterprise network relating to loyalty points of the loyalty program; remediate the position of the party relative to the enterprise network; and update the secure ledger to reflect the remediation.

In some aspects, determining the assessment for the party using the enrollment information comprises determining a probability that the party is fraudulently enrolled in the loyalty program.

In some aspects, the assessment includes reason codes, and the platform provider is configured to provide the reason codes to the one enterprise network.

In some aspects, the platform provider is configured to charge a fee to the one enterprise network for providing an indication of the assessment to the one of the enterprise networks.

BRIEF DESCRIPTION OF THE DRAWINGS

The skilled artisan will understand that the drawings are primarily for illustrative purposes and are not intended to limit the scope of the inventive subject matter described herein. In the drawings, like reference characters generally refer to like features (e.g., functionally similar and/or structurally similar elements).

DETAILED DESCRIPTION

Following below are more detailed descriptions of various concepts related to, and embodiments of, a computer system and methods for providing incentives and fraud protection within or across industries. The phrase "across industries" may refer to industries that are different or distinct from one another in that their primary businesses do not include overlapping goods/services and/or the goods/services are unrelated or are not directly related. The phrase "across industries" may refer to industries having different and/or non-overlapping Standard Industrial Classification (SIC) or North American Industry Classification System (NAICS) codes. In addition, the entities that comprise a particular industry may not compete (e.g. directly, or indirectly) with the entities that comprise another industry. It should be appreciated that various concepts introduced above and discussed in greater detail below may be implemented in any of numerous ways, as the disclosed concepts are not limited to the particular manners of implementation described herein. The enterprise networks in the common network may be in the same industry (e.g., the automotive industry), the enterprise networks in the common network may be from different, unrelated industries (e.g., a beverage retailer, a car insurance provider, a clothing designer, etc.), or the enterprise networks in the common network may include some enterprise networks that are in the same industry and other enterprise networks from different, unrelated industries. The enterprise networks may include companies that are not retailers (e.g., consumer packaged goods companies, advertisers, technology providers, etc.). Examples of specific implementations and applications are provided primarily for illustrative purposes.

Figure 1:
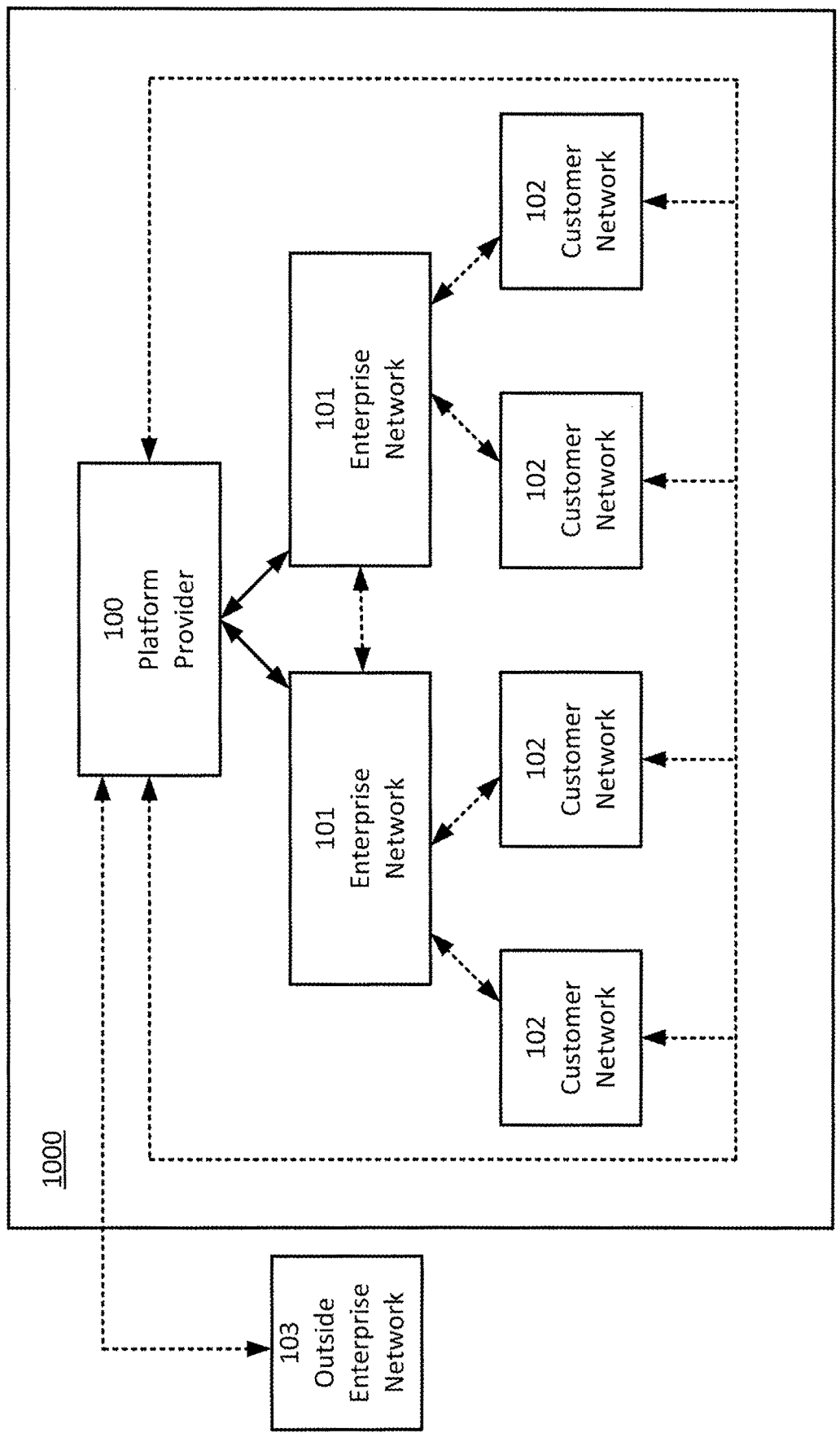
FIG. 1 illustrates an example of a common network including a platform provider, a plurality of enterprise networks, and respective customer networks of the customers of each enterprise network.

Referring to FIG. 1, a common network 1000 includes a platform provider 100 configured to manage data received from one or more enterprise networks 101. A platform provider is configured to provide a platform, which may be a centralized operating environment including a combination of any of hardware, software, communication devices, and application programming interfaces (APIs) configured to receive data/information from different sources. The platform may be configured to manage or run smaller programs or operations thereunder. An enterprise network may be a publicly owned, state or federal government owned, or privately owned network. For example, the enterprise network may include, but is not limited to, a merchant network, a retailer network, a consumer packaged goods (CPG) network, a bank network, a credit card/credit agency network, a point of sale network, a technology company network, etc. Each of the enterprise networks 101 are distinct from each other in that they are comprised of distinct computer systems and include at least some different protocols, accessibility rules, encryption and/or security. Enterprise networks 101 may further be distinct from one another in that they may be owned by different entities such as different companies, corporations, agencies, organizations, businesses, individuals, etc. The common network 1000 may be comprised of enterprise networks 101 owned by only one type of entity (i.e., all owned by companies), or the common network 1000 may be comprised of enterprise networks 101 owned by different types of entities (any combination of the entities described above). An enterprise network 101 can include any network components and software, and can vary from a large LAN or WAN to an application on an individual mobile device and components necessary to allow such a mobile device to function. Each of the one or more enterprise networks 101 in the common network 1000 has a direct service agreement with the platform provider 100. However, enterprise networks 101 in the common network 1000 may or may not have a direct service agreement with each other. In some examples, a participating enterprise network 101 may know that it is sharing information with another enterprise network 101, but may not know the identity of the another enterprise network 101. The one or more enterprise networks 101 may provide information directly to the platform provider 100, or the one or more enterprise networks may indirectly provide information to the platform provider 100 via an Application Programming Interface (API). The common network 1000 may further include one or more customer networks 102 owned and/or operated by a customer. The customer networks 102 may communicate directly with only the respective enterprise network 101, with only the platform provider 100, or with both the respective enterprise network 101 and the platform provider 100. The platform provider 100 may also communicate directly with one or more outside enterprise networks 103 outside of the common network 1000 (e.g., enterprise networks that do not have an agreement with the platform provider 100 for participation/membership in the common network 1000). The communication between the platform provider 100, the enterprise networks 101, the customer network 102, and/or the outside enterprise networks 103 may be one-way or two-way.

The platform provider 100 maintains a secure leger or record for the common network 1000. In some examples, the secure ledger or record may be a private blockchain managed by the platform provider 100. In other examples, the secure ledger or record may not include a blockchain. The secure ledger or record may be stored only on a centralized network managed by the platform provider 100, or in the case of the private blockchain, multiple copies of the secure ledger or record may be stored in a peer-to-peer network. In other examples, the secure ledger or record may be stored, encrypted, tokenized, etc. in a central server or on a cloud-based server.

A blockchain is a digital ledger in which transactions are recorded chronologically. Blockchain networks are decentralized peer-to-peer networks, where each node (described in further detail below) typically maintains a copy of the digital ledger, as opposed to a digital ledger being stored in only a central server. A private blockchain differs from a public blockchain by limiting who is allowed to participate in the blockchain network. In particular, while anyone may participate in a public blockchain network, only nodes that are invited and validated by the platform provider 100 or by a set of rules established by the platform provider 100 may participate in a private blockchain network. The platform provider 100 may manage the private blockchain network in-house, utilize a private third-party to manage the private blockchain, allow participating companies to contribute to the management of the private blockchain, or a combination thereof.

In general, both public and private blockchains operate using a plurality of nodes (e.g., processors or computing devices such as desktop computers, laptops, smart phones, tablets or servers) connected to a network such as a locally partitioned WAN/LAN network. Each node is configured to receive information about a requested transaction in real-time, execute computations to validate the transaction, confirm the record of previously verified transactions, and store a copy of the blockchain that has been updated in real-time. Transactions may be validated, for example, using a consensus protocol, which requires the nodes to agree on the same state of the blockchain. Validated transactions are recorded as blocks in the blockchain in real-time, and previously recorded blocks cannot be modified. Each block contains information about a transaction. At a minimum, the information includes a transaction amount (e.g., a sale amount, an amount of currency transferred, a number of rewards points accrued, etc.), provider information, and recipient information. If the transaction is for goods or services, the information may also identify the goods or services purchased or sold.

The secure ledger or record may be updated in real-time. In some aspects, the one or more enterprise networks 101 may have direct access to the secure ledger or record that allows the one or more enterprise networks 101 to view each entry in the secure ledger or record. In other aspects, the one or more enterprise networks 101 may not have direct access to the secure ledger or record, but the platform provider 100 may provide a website, GUI or other software application that allows the one or more enterprise networks 101 to view select information from secure ledger or record, or to view a summary or digest of the entries in the secure ledger or record. In cases where the one or more enterprise networks 101 do not have direct access to the secure ledger or record, information regarding the entries of the secure ledger or record may be delivered by the platform provider 100 to the one or more enterprise networks 101 upon request or periodically (e.g., daily, weekly, bi-weekly, monthly, quarterly, semi-annually, annually, etc.). In even further aspects, the platform provider 100 may provide the customer networks 102 access to the website, GUI or other software application that allows the one or more customer networks 102 to view select information from the secure ledger or record, or to view a summary or digest of the entries in the secure ledger or record.

The secure ledger or record may include one or more smart contracts, which are embedded computer programs that contain rules, algorithms, or processes that automatically run based on the information that is received and/or recorded into the secure ledger or record. In some aspects, when information is received by the secure ledger or record, the information may be automatically utilized as input into one or more other processes or computations. The output of those processes or computations may also be recorded in the secure ledger or record. For example, a platform provider may assess an enrollment or transaction request and record that assessment. Subsequently, the platform provider may receive additional information that the same enrollment or transaction was subsequently deemed fraudulent. The receipt of such additional information may trigger the platform provider to update its assessment protocols for future enrollment and/or transaction requests.

Although two enterprise networks 101 are illustrated in FIG. 1, any number of companies may participate in the common network 1000. In some aspects, the common network 1000 includes a plurality of enterprise networks 101, where each enterprise network 101 is aware of the identities of the other enterprise networks 101 in the common network 1000, and has a service agreement with the other enterprise networks 101 in the common network 1000. In other aspects, the common network 1000 includes a plurality of enterprise networks 101, where the enterprise networks 101 do not have service agreements with one another. When the enterprise networks 101 do not have service agreements with one another, the enterprise networks 101 may be aware of the identities of the other enterprise networks 101 in the common network 1000 or may not be aware of the identities of the other enterprise networks 101 in the common network (i.e., only the platform provider 100 is aware of all of the enterprise networks 101 participating in the common network 1000). There are a number of benefits to the enterprise networks 101 participating in the common network 1000 managed by the platform provider 100 and communicating via the platform provider 100, as opposed to directly communicating with another enterprise network 101. For example, the common network 1000 allows for a lower cost, less use of resources, and friction or hassle, as there is no need for each enterprise network 101 to enter into a contract or service agreement with a plurality of other enterprise networks 101. Instead, each enterprise network only has to enter into a single service agreement (e.g., with the platform provider 100), although each enterprise network may optionally enter into more than a single service agreement. The platform provider 100 serves as a trusted, independent third-party. This allows for enterprise networks 101 to maintain anonymity and participate in/take advantage of benefits without having to reveal to all of the other enterprise networks 101 that they are involved. Moreover, the platform provider 100 can protect data and ensure that the proprietary information/data of one enterprise network 101 is protected from other enterprise networks 101 in the common network 1000.

In the following examples, the platform provider 100 provides a payments, loyalty, and incentive platform, a credit and fraud monitoring platform, or a marketing data analytics platform to the enterprise networks 101 in the common network 1000. The examples and implementations may be combined such that the platform provider 100 provides a payments, loyalty, and incentive platform; a credit and fraud monitoring platform; and a marketing, data, and analytics platform to the enterprise networks 101 in the common network 1000. The examples and implementations may also be combined such that the platform provider 100 provides any two of a payments, loyalty, and incentive platform; a credit and fraud monitoring platform; or a marketing data analytics platform to the enterprise networks 101 in the common network 1000. The secure ledger or record in each of Examples 1-8 may or may not include a private blockchain.

Payments, Loyalty, and/or Incentives Platforms

In one example, the platform provider 100 provides a payments, loyalty, and incentive platform to the enterprise networks 101 in the common network 1000. Using the platform, various commercial arrangements are made to transfer goods, services, currency, cryptocurrency, incentives, or other items between the enterprise networks 101 that participate in the common network 1000 based on activity that occurs within the common network 1000. All arrangements, activities, and dependent actions may be verified, accounted for, and facilitated by the platform provider's secure ledger or record. Particular examples of the setup and operation of the payments, loyalty, and incentive platform will be described in the examples below. Incentives include, for example, loyalty points, a reward, a coupon, a payment, an advertisement, a marketing communication, a discount, FIAT currency, digital currency, other form of compensation, an aggregate of a plurality of discounts from one or more of the enterprise networks, or any other suitable incentive or communication that promotes a desired action to be taken.

Example 1: Secure Ledger or Record Based Cross-Company Transactions and/or Incentives In Example 1, the common network 1000 includes a platform provider 100 and two participating enterprise networks 101, namely, a Fuel Retailer "A" and an Insurance Retailer "B." The term "retailer" is used as an example, but the enterprise networks 101 may include companies that are not retailers (e.g., consumer packaged goods companies, advertisers, technology providers, etc.). Agreements are made between the Fuel Retailer "A" and the Insurance Retailer "B" such that when a customer takes a predetermined action, one of the Fuel Retailer "A" or the Insurance Retailer "B" will provide the other of the Fuel Retailer "A" or the Insurance Retailer "B" with an incentive. In some aspects, the one of the Fuel Retailer "A" or the Insurance Retailer "B" may also provide the customer with an incentive. The predetermined action may be, for example, making a transaction, purchasing a predetermined good or service, redeeming a coupon, signing up for a mailing list, etc.

Figure 2:
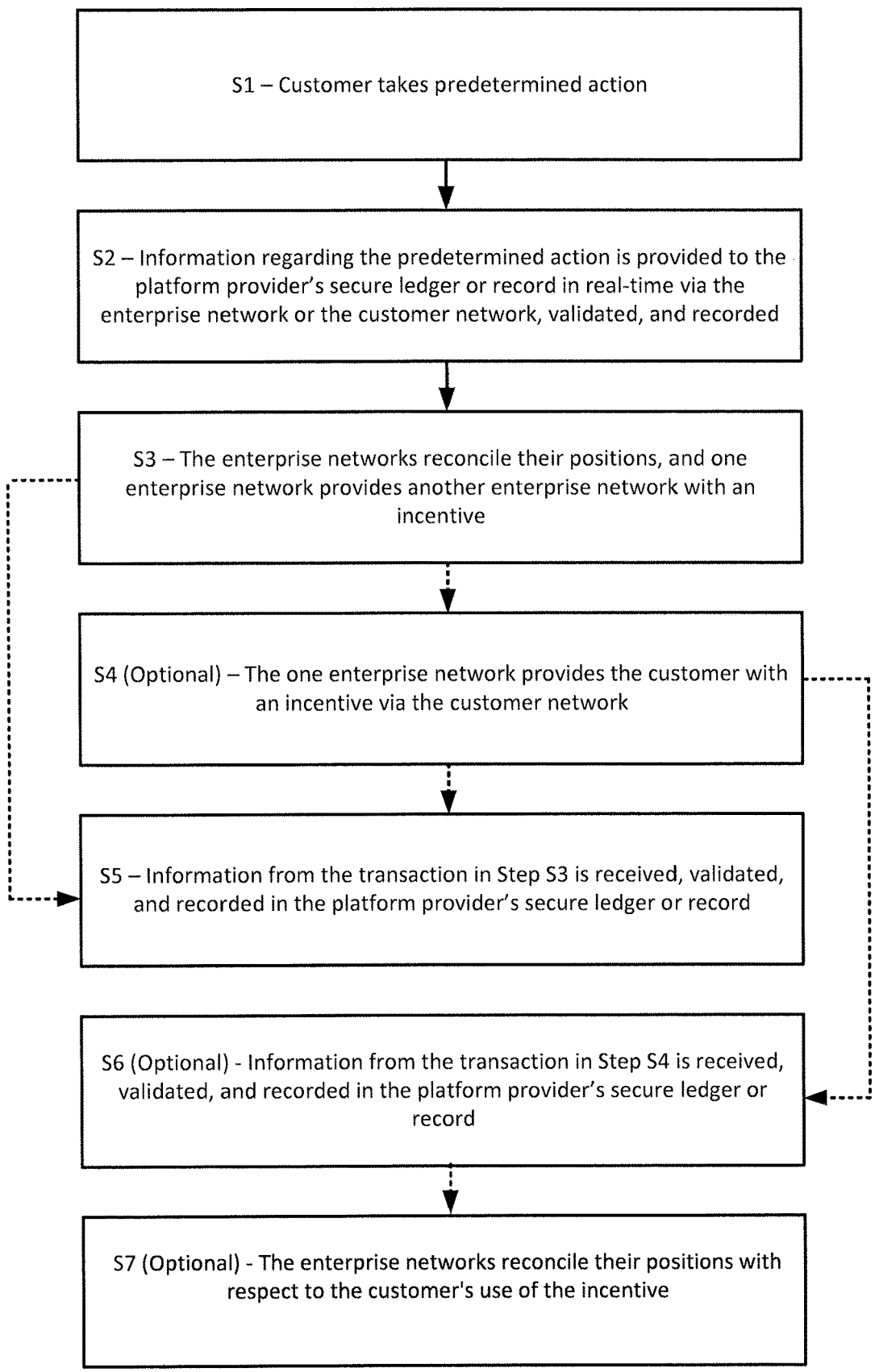
FIG. 2 illustrates a first example of a payments, loyalty, and/or incentives platform.

Referring to FIG. 2, in step S1, the customer takes the predetermined action, which for illustrative purposes in Example 1, is using the Insurance Retailer "B"'s application or rewards card to buy gas at the Fuel Retailer "A". In step S2, information regarding the predetermined action (i.e., transaction) is provided to the platform provider's secure ledger or record, verified, and recorded in the platform provider's secure ledger or record, which may or may not include a private blockchain. For purposes of discussion, the secure ledger or record will be referred to as a private blockchain, but any other secure ledger or record may be used instead of the private blockchain. The corresponding incentive is calculated and recorded in the private blockchain, including information regarding the incentive amount, provider information, and/or recipient information.

In other words, each of Fuel Retailer "A" and Insurance Retailer "B"'s net position with respect to each other is calculated and logged in the private blockchain. Step S2 occurs in real-time when the transaction from step S1 is processed. In step S3, the Fuel Retailer "A" provides the Insurance Retailer "B" with an incentive (e.g., a referral fee). In an optional step S4 (which may be omitted), the Fuel Retailer "A" may also provide the customer with an incentive (e.g. a coupon or rewards points) through the Insurance Retailer "B"'s application or rewards card. Step S3 may occur on a periodic basis or according to any agreements between the Fuel Retailer "A", the Insurance Retailer "B", and/or the Platform Provider on how and when the parties will reconcile their positions. In step S5, the platform provider's private blockchain receives information regarding payment of the incentive (e.g., when the Fuel Retailer "A" pays the referral fee to the Insurance Retailer "B"), validates, and records the information in the private blockchain. In an optional step S6 (which may be omitted), the platform provider's private blockchain receives information regarding a customer's use of an incentive (e.g., when the customer uses the coupon in the Insurance Retailer "B" application), validates, and records the information in the private blockchain. In an optional step S7 (which may be omitted), the Fuel Retailer "A" and the Insurance Retailer "B" reconcile their positions with respect to the consumer's use of the incentive.

Recording a position between two parties can refer to recording a balance of a quantity (e.g., of loyalty points, FIAT currency, digital currency, or other form of compensation) between the two parties. The balance can indicate that one party owes another party a certain amount of the quantity. In some embodiments, the balance can be unconditional. In other embodiments, the balance is conditional on one or more predetermined conditions occurring and/or being verified. Reconciling or remediating a position can refer to transferring an amount of the quantity that matches the balance from one of the parties to another of the parties (e.g., debiting an account of one of the parties, and crediting an account of the other of the parties).

In Example 1, the delivery of incentives is tied to a predetermined action taken by the customer. However, in other examples, the delivery of the incentives may not be tied to the predetermined action. For example, the Fuel Retailer "A" and the Insurance Retailer "B" may have an agreement to pay each other a periodic flat fee (e.g., monthly fee) if a minimum threshold of activities are performed. Additionally, the predetermined action or the payment of the incentives do not require an application (e.g., mobile application). In other examples, other technologies or mechanisms can be used (e.g., websites, physical cards, other payment or loyalty tenders, etc.).

In Example 1, the platform provider may allow one enterprise network to provide consumer incentives in another enterprise network's application or website, and/or may allow one enterprise network's application or website to be used at another enterprise network. Certain conventional systems do not allow for providing incentives across networks, and are not able to track, manage, and update use of the incentives in real-time. The features described herein can provide for such incentives by, for example, leveraging the platform provider 100 to maintain a secure ledger, and by connecting multiple enterprise networks 101 to the platform provider 100. The benefits of the process described in Example 1 include cross-enterprise network promotion, which may result in more enrollments and transactions. There is a cost savings passed on to the customers (the application/tender growth may be subsidized by other enterprise networks), as well as a new monetization opportunity for the enterprise network's application or website. There is a new marketing channel for the enterprise network providing the incentive and an opportunity to capitalize on increased scale and growth. Moreover, there is an instant accounting, reconciliation, and settlement of the positions of the enterprise networks/customers, a real-time record/proof of all transactions, including the linkages between initial transactions and subsequent activities across different parties. These features may further reduce hassle, effort, and/or cost for enterprise networks and/or customers. In addition, the platform provider receives additional data that may be used to potentially identify ancillary services to be provided to the participating enterprise networks/customer networks.

Example 2: Secure Ledger or Record Based Cross-Network Incentives

In Example 2, the common network 1000 includes a platform provider 100 and a plurality of participating enterprise networks 101, namely, a Fuel Retailer "A," an Insurance Retailer "B," a Grocery Retailer "C," and a Taxi App "D." The term "retailer" is used as an example, but the enterprise networks 101 may include companies that are not retailers (e.g., consumer packaged goods companies, advertisers, technology providers, etc.). Agreements are made between each of the Fuel Retailer "A," the Insurance Retailer "B," the Grocery Retailer "C," and the Taxi App "D" such that when a customer purchases a good or service from one of the enterprise networks 101, the other enterprise networks 101 are able to provide advertising and/or incentives to the customer. The advertising and/or incentives may be aggregated.

Figure 3:
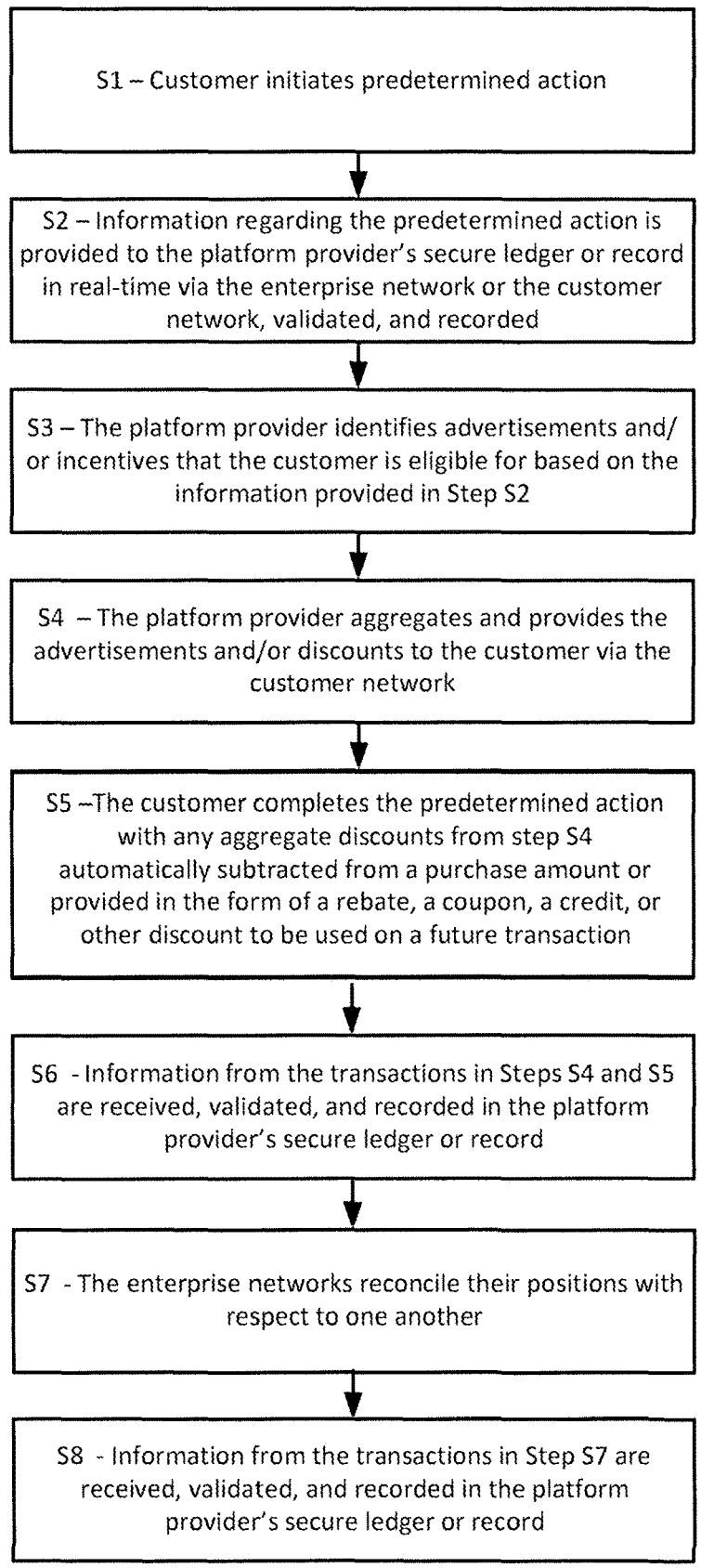
FIG. 3 illustrates a second example of a payments, loyalty, and/or incentives platform.

Referring to FIG. 3, in step S1, the customer takes the predetermined action, which for illustrative purposes in Example 2, is initiating a transaction to purchase gas at the Fuel Retailer "A." In step S2, information regarding the predetermined action (i.e., transaction) is provided to the platform provider's secure ledger or record, verified, and recorded in the platform provider's secure ledger or record, which may or may not include a private blockchain. For purposes of discussion, the secure ledger or record will be referred to as a private blockchain, but any other secure ledger or record may be used instead of the private blockchain. In step S3, the platform provider identifies that the customer is eligible for separate advertisements and/or incentives that are sponsored by the Insurance Retailer "B", Grocery Retailer "C", and Taxi App "D" (e.g., based on the customer's location, behavior, demographics, past behaviors, transaction details, and/or any other suitable factor). In some examples step S3 may occur before step S1. In step S4, the discounts are calculated separately, stacked on top of each other, and delivered to the customer via the customer network 102 in aggregate, for example, on an application on the customer's mobile device (smart phone, tablet, etc.) in real-time or delivered after the transaction is completed. In step S5, when the customer completes their transaction (e.g., finishes pumping gas), the discounts in aggregate may be automatically subtracted from the final purchase amount, such that the purchase amount net of the discounts is charged to the customer's payment tender. Alternatively, the aggregate discount may be provided in the form of a rebate, a coupon, a credit, or other discount to be used on a future transaction. In some examples, the customer may have the option to save or otherwise accumulate aggregate discounts from each of a plurality of transactions, and combine the aggregate discounts for use in a single, future transaction. In step S6, all of these activities, and each party's net position, are calculated and logged in the platform provider's private blockchain. In step S7, on a periodic basis or according to any agreements between the enterprise networks 101 and/or the Platform Provider on how/when the parties will reconcile their positions, the Fuel Retailer "A" collects the discount amounts from one or more of the Insurance Retailer "B," the Grocery Retailer "C," and the Taxi App "D." A discount amount can be collected from each of the Insurance Retailer "B," the Grocery Retailer "C," and the Taxi App "D," or from only the participants whose incentive was actually used by the customer. In Step S8, the activities of step S7 are validated and recorded in the platform provider's private blockchain. If the aggregate discount is received in real-time, the accounting is logged such that the parties can reconcile who owes what to whom after the transaction (e.g., immediately after or after a predetermined period of time). If the aggregate discount is subsequently received, the customer has a receivable asset that can be later cashed in. The effective payable liability can be recorded in the secure ledger or record. The enterprise networks can reconcile their positions at that time or after the customer cashes in the aggregate discount.

In cases in which advertisements are being aggregated instead of discounts, advertisements may be displayed to the customer through their payment mechanism (e.g., a mobile application or other interface such as a point-of-sale terminal). The act of displaying the advertisements would be recorded in the secure ledger or record, and the enterprise networks would reconcile who pays what to whom based on the recorded actions.

In Example 2, the platform provider allows one or more enterprise networks to provide incentive through another enterprise network's application or website. These incentives can be stacked on top of each other and delivered to the consumer in aggregate. Certain conventional systems do not allow for providing incentives across networks, and are not able to track, manage, and update use of the incentives in real-time. The features described herein can provide for such incentives by, for example, leveraging the platform provider 100 to maintain a secure ledger, and by connecting multiple enterprise networks 101 to the platform provider 100. The benefits of the process described in Example 2 include cross-enterprise network promotion, which may result in more enrollments and transactions. There is a cost savings passed on to the customers (the application/tender growth may be subsidized by other enterprise networks), as well as a new monetization opportunity for the enterprise network's application or website. There is a new marketing channel for the enterprise network providing the incentive and an opportunity to capitalize on increased scale and growth. Moreover, there is an instant accounting, reconciliation, and settlement of the positions of the enterprise networks/customers, a real-time record/proof of all transactions, including the linkages between initial transactions and subsequent activities across different parties. These features may further reduce hassle, effort, and/or cost for enterprise networks and/or customers. In addition, the platform provider receives additional data that may be used to potentially identify ancillary services to be provided to the participating enterprise networks/customer networks.

Example 3: Secure Ledger or Record Based Open-Loop Transactions/Referral Network In Example 3, the common network 1000 includes a platform provider 100 and a plurality of participating enterprise networks 101, namely, a Fuel Retailer "A," an Insurance Retailer "B," and a Grocery Retailer "C." The term "retailer" is used as an example, but the enterprise networks 101 may include companies that are not retailers (e.g., consumer packaged goods companies, advertisers, technology providers, etc.). Each enterprise network 101 enters into an agreement with the platform provider 100, where they will each pay and earn referral fees based on certain actions. For example, the Fuel Retailer "A" agrees to pay a referral fee to the platform provider 100 for each customer that buys gas at the Fuel Retailer "A" using the application or other interface of any other enterprise network 101 in the common network 1000. Similarly, the platform provider 100 agrees to provide a commission fee to any enterprise network 101 in the common network 1000 that allows their application to be used at another enterprise network 101 in the common network 1000. The platform provider 100 retains a network fee (e.g., a difference between the referral fee less the commission fee) for facilitating these services. The enterprise networks 101 in the common network 1000 may or may not have agreements with each other. The enterprise networks 101 may keep their transactional activity anonymous.

Figure 4:
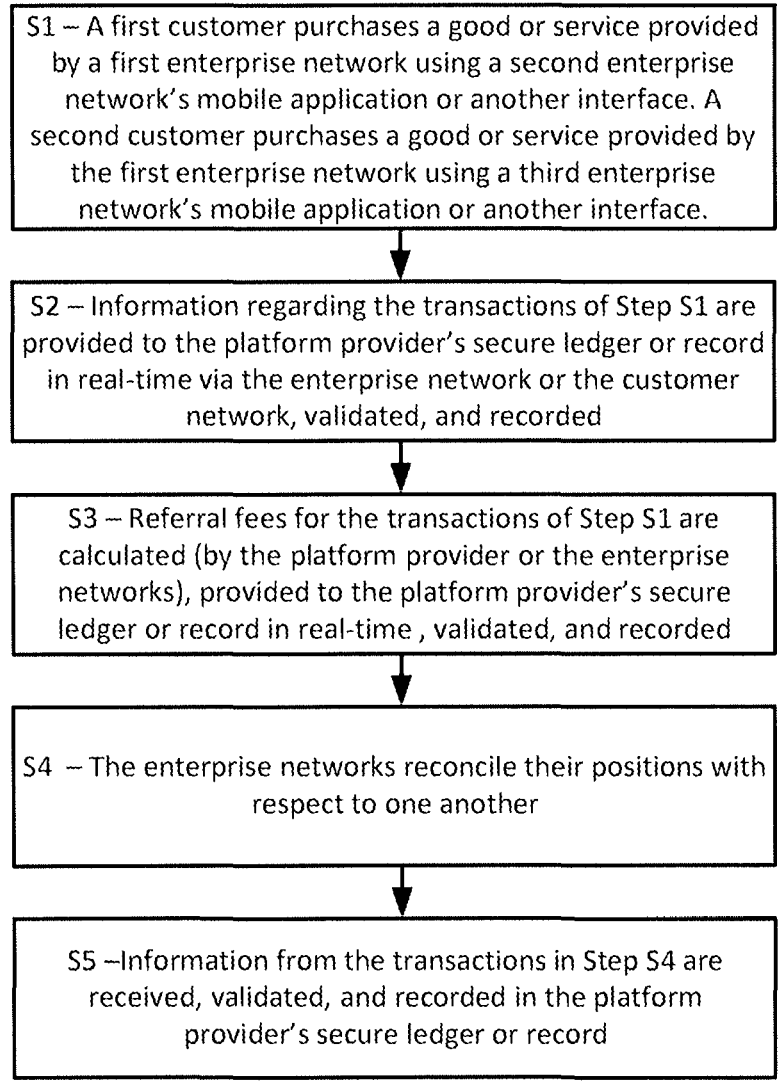
FIG. 4 illustrates a third example of a payments, loyalty, and/or incentives platform.

Referring to FIG. 4, in step S1, a first customer purchases a good or service provided by a first enterprise network 101 using a second enterprise network's mobile application, and a second customer purchases a good or service provided by the first enterprise network 101 using a third enterprise network's mobile application or other interface. For example, a customer uses the Insurance Retailer "B" application to buy gas at the Fuel Retailer "A," and another customer uses the Grocery Retailer "C" application to buy gas at the Fuel Retailer "A." The transactions occur in the common network 1000 and in step S2, are validated/recorded in real-time in the platform provider's secure ledger or record, which may or may not include a private blockchain. For purposes of discussion, the secure ledger or record will be referred to as a private blockchain, but any other secure ledger or record may be used instead of the private blockchain. In Step S3, the referral fees for each transaction are also calculated, validated, and recorded in real-time in the platform provider's private blockchain. Each party's net position with each other (i.e., the platform provider 100 with respect to the enterprise networks 101, and the enterprise networks 101 with respect to one another) is calculated, validated and recorded in the blockchain in real-time. In Step S4, on a periodic basis or how/when agreed between the platform provider 100 and the enterprise networks 101, the platform provider 100 will reconcile the net position of each enterprise network 101 in the common network 1000. In Step S5, the reconciled positions are validated and recorded in the private blockchain. Every action is validated according to a consensus protocol that cannot be disputed by any party, while allowing the enterprise networks 101 to remain anonymous to each other if they so choose. For example, while the Fuel Retailer "A" will know that it had 2 referral transactions, the Fuel Retailer "A" may not know which enterprise networks 101 they are from. While the Insurance Retailer "B" and the Grocery Retailer "C" would each know that they are due 1 commission fee, the Insurance Retailer "B" and the Grocery Retailer "C" may not know that the commission fee is coming from the Fuel Retailer "A" or that the other company is also receiving a commission. This anonymity enables all of the enterprise networks 101 to benefit from the scale of the common network 1000, without having to share customer, transactional, or other data with the other enterprise networks 101. The platform provider 100 serves as a trusted third party facilitating these transactions.

In Example 3, the platform provider facilitates an open-loop transactions network where each participating enterprise network's application or website may be used to transact at another enterprise network within the common network. Certain conventional systems do not allow for managing transactions anonymously across networks. The features described herein can provide for managing such anonymous transactions by, for example, leveraging the platform provider 100 to maintain a secure ledger, and by connecting multiple enterprise networks 101 to the platform provider 100. The transactions may be logged anonymously. The benefits of the process described in Example 3 include a cost savings for the enterprise network where the transaction occurs (more coverage/potential transactions at lower cost), revenue for an enterprise network's application that is used in the transaction (e.g., the enterprise network may get a portion of the processing fee), and the ability for all enterprise networks to capitalize on a network scale, while protecting the brand/proprietary data from other networks (if anonymous). In addition, the platform provider receives additional data that may be used to potentially identify ancillary services to be provided to the participating enterprise networks/customer networks Example 4: Secure Ledger or Record Based Cross-Network Loyalty Program In Example 4, the common network 1000 includes a platform provider 100 and a plurality of participating enterprise networks 101, namely, a Fuel Retailer "A," an Insurance Retailer "B," and a Grocery Retailer "C." The term "retailer" is used as an example, but the enterprise networks 101 may include companies that are not retailers (e.g., consumer packaged goods companies, advertisers, technology providers, etc.). Each enterprise network 101 agrees to participate in a cross-network loyalty program managed by the platform provider 100 such that a customer can earn "points" (or similar concept such as miles or tokens) at any enterprise network 101 in the common network 1000, and redeem "points" (or similar concept) at any other enterprise network 101 in the common network 1000. The value of a "point" may be established for each enterprise network 101 separately, and tied to currency such as fiat currency (e.g., USD). The point-to-fiat currency conversion tables, which may be static or dynamic, are validated and recorded in the platform provider's secure ledger or record, enabling a fair determination of point values for earning and redeeming. The secure ledger or record may or may not include a private blockchain. For purposes of discussion, the secure ledger or record will be referred to as a private blockchain, but any other secure ledger or record may be used instead of the private blockchain.

Figure 5:
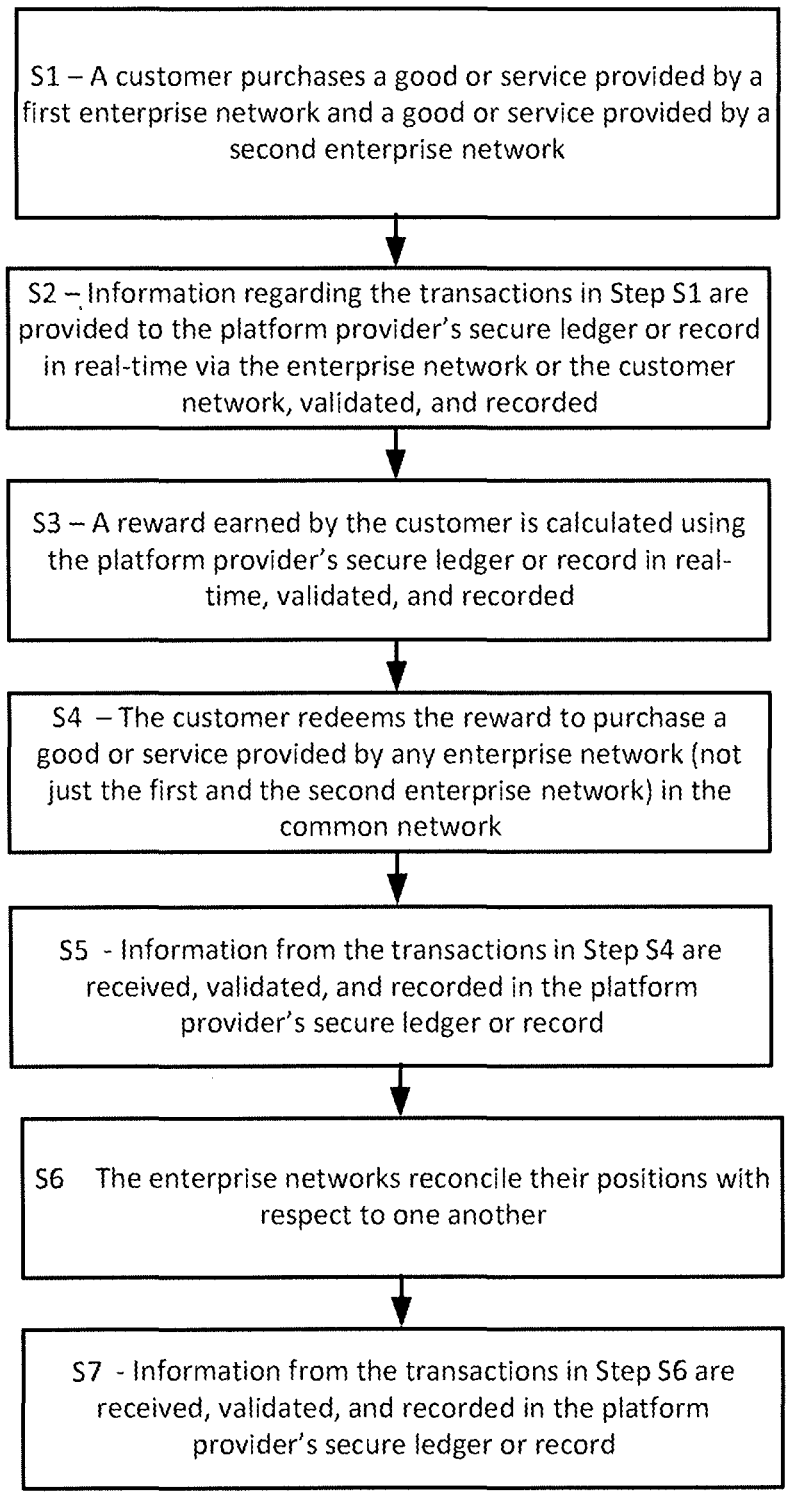
FIG. 5 illustrates a fourth example of a payments, loyalty, and/or incentives platform.

Referring to FIG. 5, for example, in Step S1, a customer buys insurance at the Insurance Retailer "B," and then buys gas at the Fuel Retailer "A." The transactions occur in the common network 1000 and in step S2, are validated and recorded in the platform provider's private blockchain. In Step S3, the number of points earned by the customer, the fiat value of the points (i.e., how much each enterprise network 101 has to pay), and each party's net position with respect to each other is calculated, validated and recorded in the platform provider's private blockchain. In Step S4, the customer may then redeem the points at any of the enterprise networks 101, for example, by buying groceries at the Grocery Retailer "C." In step S5, the redemption of the points, and the corresponding fiat values of the points (i.e., the respective payable positions of the Insurance Retailer "B" and the Fuel Retailer "A" to the Grocery Retailer "C") are calculated, validated and recorded in the platform provider's private blockchain. In Step S6, the settlement of these transactions may be instant, on a periodic basis, or how/when the parties have agreed to reconcile their positions. In Step S7, the reconciled positions are validated and recorded in the platform provider's private blockchain. The platform provider 100 acts as a trusted third party to manage/facilitate the program on behalf of all of the enterprise networks 101.

In Example 5, the platform provider facilitates a cross-merchant loyalty program, allowing customers to earn and redeem points/awards across participating enterprise networks in the common network. Certain conventional systems do not allow for providing incentives across networks, and are not able to track, manage, and update use of the incentives in real-time. The features described herein can provide for such incentives by, for example, leveraging the platform provider 100 to maintain a secure ledger, and by connecting multiple enterprise networks 101 to the platform provider 100. Benefits of this system/process include transaction growth across the network, fair determination of point values for earning/redeeming, and instant accounting, reconciliation, and settlement of positions and payments with respect to all parties. In addition, the platform provider receives additional data that may be used to potentially identify ancillary services to be provided to the participating enterprise networks/customer networks In each of Examples 1-4 discussed above, the use of the platform provider's private blockchain allows for the real-time record/proof of all transactions, instant accounting of all activities and absolute/relative positions of the companies with respect to one another, and instant calculation and reconciliation of transfers/exchanges of value across different currencies (e.g., points, currencies, etc.). The platform provider's private blockchain allows for the accurate recordation of multiple, complex arrangements across multiple companies, a linking and tracking of an initial transaction (predetermined action) and subsequent activities across multiple companies. Information regarding specific transaction information may be visible to all applicable parties, or visible to only the platform provider. In other words, the platform provider's private blockchain may provide a trusted and neutral way to enable cross-party exchanges anonymously (e.g., without each party having to maintain contractual relationships or disclose all data with all other parties). Use of the common network 1000 also results in lower friction and costs of transaction processing and accounting. The common network 1000 accelerates growth and/or lowers costs for participating enterprise networks 101.

Credit and Fraud Monitoring Platforms

In another example, the platform provider 100 provides a credit and fraud monitoring platform to the enterprise networks 101 in the common network 1000 using the platform provider's secure ledger or record, which may or may not include a private blockchain. The platform provider 100 has agreements with each enterprise network 101 in the network. The individual enterprise networks 101 may or may not have direct agreements with each other. All activity that occurs within the common network 1000 may be verified, accounted for, and facilitated by the platform provider's secure ledger or record. The platform provider 100 uses the information recorded in the secure ledger or record provided by each of the enterprise networks 101 in the common network 1000 to assess risk or generate an assessment of risk, monitor fraud or suspicious activity, make credit decisions, or take other actions. In some aspects, only the enterprise networks 101 that are part of the common network 1000 (i.e., "participating enterprise networks") may contribute information to the secure ledger or record, or request that the platform provider 100 provide a credit and/or fraud assessment. In other aspects, enterprise networks that are not part of the common network 1000 (i.e., enterprise networks that do not have an agreement with the platform provider 100) may also contribute information to the secure ledger or record, or request that the platform provider 100 provide a credit and/or fraud and/or other assessment. With regard to transactions, the term "fraud" or "fraudulent" includes suspicious, questionable, or high-risk activities that may indicate, for example, that the person or entity initiating the transaction is being dishonest (e.g., providing false or outdated information), has insufficient funds or other inability to pay for the transaction on-time or at-all, is unauthorized to initiate the transaction, is using an unauthorized transaction device, or is otherwise acting in bad faith. In some examples, the term "fraud" or "fraudulent" may include the factors that amount to the legal definition of "fraud." In some examples, the term "fraud" or "fraudulent" may include a set of one or more other attributes that may be considered undesirable suspicious activity, likelihood of default, likelihood of repurchasing, can they pay for it—transaction successful/repeatable—other attributes see paragraph 0002—might track attributes the same across whole platform or specific attributes depending on what enterprise network wants to track or what the platform provider determines should be tracked/helpful to be tracked for that particular enterprise network vis-à-vis an enrollment/application or a transaction; such attributes may be defined for the entire platform, and/or for specific enterprise networks within a platform, and/or for specific consumer networks within an enterprise network. Certain conventional systems do not allow for tracking data patterns across networks, and are not able to optimize detection of possible fraudulent behavior accordingly. The features described herein can provide for such tracking and detection by, for example, leveraging the platform provider 100 to maintain a secure ledger, and by connecting multiple enterprise networks 101 to the platform provider 100.

Example 5: Secure Ledger or Record Based User/Enrollment Verification and Access to Verification/Scoring Data In Example 5, the common network 1000 includes a platform provider 100 and a plurality of participating enterprise networks 101, namely, a Fuel Retailer "A," an Insurance Retailer "B," and a Grocery Retailer "C." The term "retailer" is used as an example, but the enterprise networks 101 may include companies that are not retailers (e.g., consumer packaged goods companies, advertisers, technology providers, etc.). The platform provider 100 establishes rules for making a decision on, or assessing the identity and/or validity of a customer and/or information provided by the customer and/or device used by the customer. The information provided by the customer may be provided, for example, during an enrollment process for a payment tender, loyalty program, or other application. The rules established by the platform provider 100 may be static or dynamic. In some examples, the rules may be based on proprietary technology, including machine-learning algorithms and/or artificial intelligence that may be influenced by time, location, geography, demographics, industry, device, identification, personally identifiable information, banking or financial information, transactional information, behavioral information, social media, digital footprint, past customer, enrollment, or transactional behaviors, or other factors pertaining to a customer and/or an enrollment or application. The assessments may take the form of an overall numeric score, a letter grade (e.g., A, B, C, D, or F), an individual score per attribute, a binary (yes/no) decision, or other forms. The rules established by the platform provider 100 may be embedded in the secure ledger or record itself, or may be provided in a separate decision system configured to communicate with the secure ledger or record.

Figure 6:
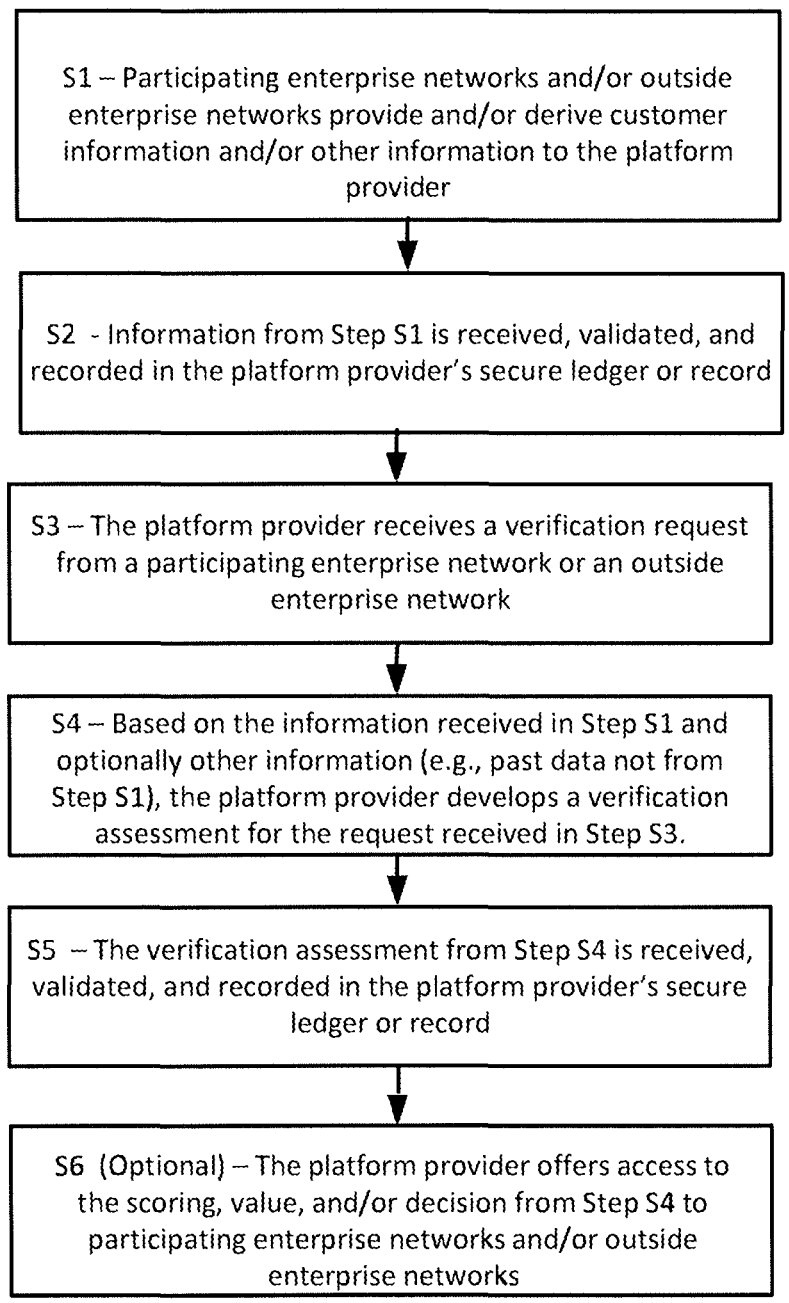
FIG. 6 illustrates a first example of a credit and/or fraud monitoring platform.

Referring to FIG. 6, for example, in a Step S1, the participating enterprise networks 101 and/or outside enterprise networks 103 provide information regarding every customer that enrolls/accesses the enterprise network—whether through Fuel Retailer "A," Insurance Retailer "B," or Grocery Retailer "C"—to the platform provider 100. In Step S2, each enrollment attempt and relevant information (also referred to as "enrollment information" in the context of the enrollment attempt) about the customer received in Step S1 are validated and recorded in the platform provider's secure ledger or record, which may or may not include a private blockchain, and fed into the platform provider's verification system. For purposes of discussion, the secure ledger or record will be referred to as a private blockchain, but any other secure ledger or record may be used instead of the private blockchain. The relevant information may include customer information comprising a name, address, telephone number, credit card number, payment account number, social security number, driver's license or state identification number, IP address, SIM number, loyalty account information, credit history, past enrollment or transaction history and or bank account number or other data that may be collected in an enrollment or application. In Step S3, the platform provider 100 receives a verification request from a participating enterprise network 101 or an outside enterprise network 103. In Step S4, the platform provider 100 assesses at least the information provided in Step S1 (other information may also be assessed), and develops a verification of that customer and/or enrollment identified in the verification request received in Step S3. The verification may include, for example, a generated assessment of a probability (e.g., a percentage, a score, a grade, a range, a rating, a yes/no decision, or other suitable value) that the customer and/or enrollment and/or one or more attribute(s) within an enrollment is fraudulent or suspicious or includes other attributes that may be tracked by the platform provider. In Step S5, the resultant assessment (or updates to past assessments) of the customer and/or enrollment is also validated and recorded in real-time in the platform provider's private blockchain. The assessment decisions may be specific to an individual or aggregated by customer group (e.g., by particular company). The information provided may include additional information including, but not limited to, reasons codes or other supporting data elements corresponding to the overall assessment. The platform provider 100 may charge a fee for such access to the requesting party. This fee may be a flat fee or dynamically calculated. Discounted or premium pricing may be offered based on factors including whether the requesting company is one of the enterprise networks 101 within the common network 1000, and/or how much information/data the requesting party has supplied as data inputs to the platform provider's private blockchain. The calculation of the fees, access to the results, and settlement of the amounts owed to each party are validated and recorded in the platform provider's private blockchain. The platform provider 100 may also offer a feedback loop such that subsequent activity is sent back to the common network 1000. This information may be validated and recorded in the platform provider's private blockchain and fed into the platform provider's verification system for incorporation into subsequent assessments.

In some examples, in Step S3, the platform provider 100 may receive a verification request from one of the enterprise networks 101. The verification request may be a request to verify a party that has some record in a secure ledger maintained by the platform provider 100. The verification request may be a request to verify that the party is enrolled in a loyalty program. Responsive to receiving the verification request, platform provider 100 may determine an assessment for the party using enrollment information accessible to the platform provider 100. The enrollment information may include at least one of: customer information comprising a name, an address, a telephone number, a credit card number, a payment account number, a social security number, a driver's license or state identification number, an internet protocol (IP) address, a subscriber identification module (SIM) number, loyalty account information, at least a portion of a credit history, at least a portion of a past enrollment or transaction history, or a bank account number. The assessment may indicate whether the party is non-fraudulently enrolled in the loyalty program (e.g., may indicate that the party is enrolled in the loyalty program, and/or may indicate that a risk of fraud is below a predetermined threshold). The platform provider 100 may record the assessment for the party in the secure ledger. The platform provider 100 may provide an indication of the assessment to the enterprise network 101 that requested the verification. The platform provider 100 may receive, from the enterprise network 101, a request to remediate a position of the party relative to the enterprise network 101. The request may be received subsequent to the platform provider 100 providing the indication of the assessment to the enterprise network 101, or may be received as part of the verification request. The position of the party relative to the enterprise network 101 may relate to loyalty points of the loyalty program (e.g., may indicate a balance of loyalty points). The platform provider 100 may remediate the position of the party relative to the enterprise network 101, and update the secure ledger to reflect the remediation. In some example, determining the assessment for the party using the enrollment information comprises determining a probability that the party is fraudulently enrolled in the loyalty program (e.g., by determining that the risk of fraud is below a predetermined threshold). In some examples, the assessment includes reason codes indicating significant factors that affected the assessment, and the platform provider is configured to provide the reason codes to the enterprise network 101. In some examples, the platform provider is configured to charge a fee to the one enterprise network for providing an indication of the assessment to the one of the enterprise networks.

In some examples, Step S3 is optional and may be omitted (i.e., the platform provider may carry out Step S4 without receiving a verification request). In some examples, Step S2 may occur after Step S4, for example, simultaneously with Step S5.

In Example 5, the platform provider may develop user verification scores based on information collected across the platform. The platform may allow other parties (participating or non-participating enterprise networks, credit agencies, etc.) to access/query the platform for scores and/or decisions, and may charge a fee for such access. The fee may be static or dynamic, and discounts/premiums may be applied based on volume or other factors. The system/process of Example 5 provides an enterprise network with the platform provider's advantaged decision making system. High volume participants may be incentivized to provide data (e.g., the more data a party provides to the platform provider, the deeper the discount may be for accessing the resultant scores). Moreover, better device, enrollment/application, and customer verification assessments result in better approval decisions/user experience (fewer false-negative declines) and decreased instances of fraud (lower fraud losses).

Example 6: Secure Ledger or Record Based User/Transactions Assessment and Access to Assessment/Scoring Data In Example 6, the common network 1000 includes a platform provider 100 and a plurality of participating enterprise networks 101, namely, a Fuel Retailer "A," an Insurance Retailer "B," and a Grocery Retailer "C." The term "retailer" is used as an example, but the enterprise networks 101 may include companies that are not retailers (e.g., consumer packaged goods companies, advertisers, technology providers, etc.). The platform provider 100 establishes rules for making a decision on, or assessing the credit worthiness, value, riskiness, and/or other attributes of, a customer, a transaction request, a credit request, and/or other requests. These rules are recorded in the platform provider's secure ledger or record, which may or may not include a private blockchain. For purposes of discussion, the secure ledger or record will be referred to as a private blockchain, but any other secure ledger or record may be used instead of the private blockchain. These rules may be static or dynamic. In some examples, the rules may be based on proprietary technology, including machine-learning algorithms and/or artificial intelligence that may be influenced by time, location, geography, demographics, industry, device, identification, personally identifiable information, banking or financial information, transactional information, behavioral information, social media, digital footprint, past customer, enrollment, or transactional behaviors, or other factors pertaining to a customer and/or an enrollment or transaction. The assessments may take the form of an overall numeric score, a letter grade (e.g., A, B, C, D, or F), an individual score per attribute, a binary (yes/no) decision, or other forms.

Figure 7:
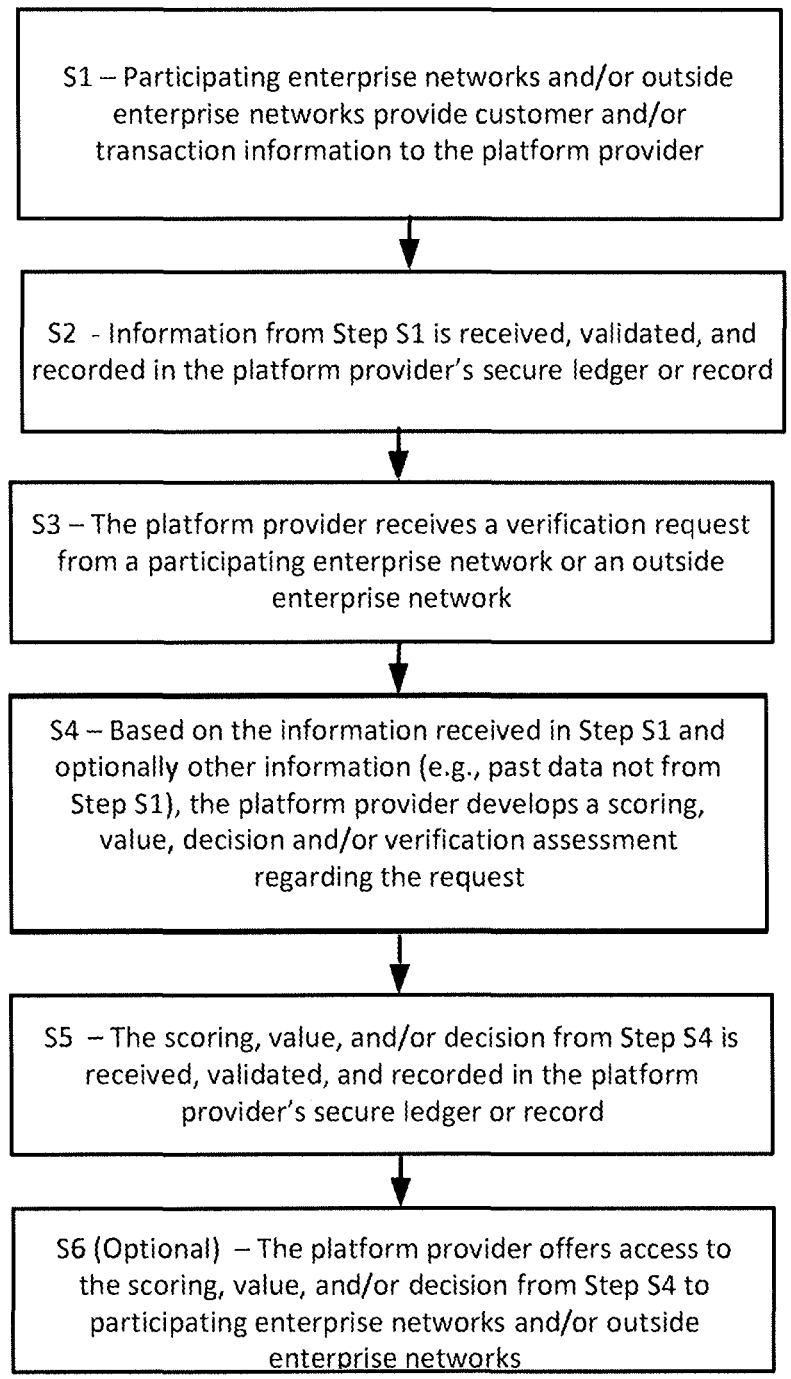
FIG. 7 illustrates a second example of a credit and/or fraud monitoring platform.

Referring to FIG. 7, for example, in step S1, Fuel Retailer "A," Insurance Retailer "B," and Grocery Retailer "C" provide information (e.g., customer and/or transaction information) to the platform provider 100. In Step S2, the information from Step S1 is received, validated and recorded in the platform provider's secure ledger or record. In Step S3 the platform provider 100 receives a verification request from a participating enterprise network 101 or an outside enterprise network. In step S4, based on the information received in Step S1, the platform provider 100 assesses the information provided and develops a scoring, value, and/or decision regarding the customer in general, the transaction in general, or relative to one or more specific transaction attributes (e.g., amount of transaction, time/date of transaction, location of transaction, transaction velocities relative to expected "normal" patterns, etc.). For example, the platform provider 100 may generate an assessment of a probability (e.g., a percentage, a score, a grade, a range, a rating, a yes/no decision, or other suitable value) related to the credit worthiness, value, riskiness, and/or other attributes of, a customer, a transaction request, a credit request, and/or other requests. In Step S3, each transaction request—whether completed or not—and other relevant information about the customer, is validated and recorded in the platform provider's private blockchain, fed into the platform provider's verification system, and the resultant assessment (or updates to past assessments) of the customer and/or transaction is also validated and recorded in the platform provider's private blockchain in real-time. In Step S6, the platform provider 100 may offer access to its assessment decisions or scores to enterprise networks 101 within the common network 1000 or to enterprise networks 103 outside of the common network 1000 (e.g., via an API). The assessment decisions may be specific to an individual or aggregated by customer group (e.g., by particular company). The information provided may include additional information including, but not limited to, reasons codes or other supporting data elements corresponding to the overall assessment. The platform provider 100 may charge a fee for such access to the requesting party. This fee may be a flat fee or dynamically calculated. Discounted or premium pricing may be offered based on factors including whether the requesting company is one of the enterprise networks 101 within the common network 1000, and/or how much information/data the requesting party has supplied as data inputs to the platform provider's private blockchain. The calculation of the fees, access to the results, and settlement of the amounts owed to each party are validated and recorded in the platform provider's private blockchain. The platform provider 100 may also offer a feedback loop such that subsequent activity is sent back to the common network 1000. This information is validated and recorded in the platform provider's private blockchain and fed into the platform provider's verification system for incorporation into subsequent assessments.

In some examples, Step S3 is optional and may be omitted (i.e., the platform provider may carry out Step S4 without receiving a verification request). In some examples, Step S2 may occur after Step S4, for example, simultaneously with Step S5.

In Example 6, the platform provider may develop consumer credit and/or transaction assessment scores and/or decisions based on information collected across the platform. The platform may allow other parties (participating or non-participating enterprise networks, credit agencies, etc.) to access/query the platform for scores and/or decisions, and may charge a fee for such access. The fee may be static or dynamic, and discounts/premiums may be applied based on volume or other factors. The system/process of Example 6 provides an enterprise network with the platform provider's advantaged decision making system. High volume participants may be incentivized to provide data (e.g., the more data a party provides to the platform provider, the deeper the discount may be for accessing the resultant scores). Moreover, better transaction and customer assessments result in better approval decisions/user experience (fewer false-negative declines) and decreased instances of fraud (lower fraud losses).

Example 5 describes how the platform provider may offer access to enrollment assessments, while Example 6 describes how the platform provider may offer access to transaction assessments. In some examples, Examples 5 and 6 may be combined such that data from the enrollment assessments informs the transactions assessments and vice versa. In other examples, the methods/services described in Examples 5 and 6 may be offered in aggregate (i.e., a combination of enrollment and transaction verification services may be bundled and offered together to an enterprise network (participating or non-participating), credit bureau or other payments company). In even further examples, the platform provider may use and apply the enrollment assessments and/or transaction assessments for its own internal use and/or for other platform provider purposes (e.g., the platform provider may perform enrollment and/or transaction assessments as part of its own payments platform without disclosing or offering the assessments to another party).

In each of Examples 5-6 discussed above, the use of the platform provider's private blockchain allows for the platform provider to securely assess activities/behaviors within and across a multi-merchant/party network. The platform provider's unique role in monitoring enrollment, transactional, and other activity within and across companies/industries results in an advantaged ability to authenticate and assess data for enrollment, fraud, risk, credit, and other purposes. The private blockchain may also link and track initial transactions, scoring decisions, and customer behavior with subsequent decisions, transactions, and actions. User/enrollment assessments and transaction verification assessments can be made independently and/or in conjunction with each other. Machine learning/artificial intelligence can be incorporated directly in the verification system and updated using information from the private blockchain. This allows for better tracking of good and bad customers, and the value, credit worthiness, enrollment or transaction risk of customers to help minimize risk, lower the cost of transaction processing, lower fraud losses, etc. Companies may anonymously provide data to, and access information from, the private blockchain in a way that benefits all participants in the common network 1000, while also protecting each participant's proprietary data and customer anonymity as desired for privacy purposes.

By allowing enterprise networks from the same industry or different industries to contribute customer information, and/or by allowing participating networks and/or outside networks to contribute customer information, the platform provider is able to assess a wider spectrum of behavior, consumer segments, and transactions. The increased sample size, scope, and breath of contents in the compiled customer information creates a better result for decisions related to credit and fraud monitoring.

Marketing Data Analytics Platforms

In another example, the platform provider 100 provides a marketing data analytics platform to the enterprise networks 101 in the common network 1000. Using the platform, the platform provider 100 offers the customer information and/or information related to customer activity to participating enterprise networks 101 and/or use the information to facilitate the targeting and/or distribution of marketing, advertising, messaging, loyalty or other activities to customer. All arrangements, activities, and dependent actions are verified, accounted for, and facilitated by the platform provider's secure ledger or record. Particular examples of the setup and operation of the marketing data analytics platform will be described in the examples below.

Figure 8:
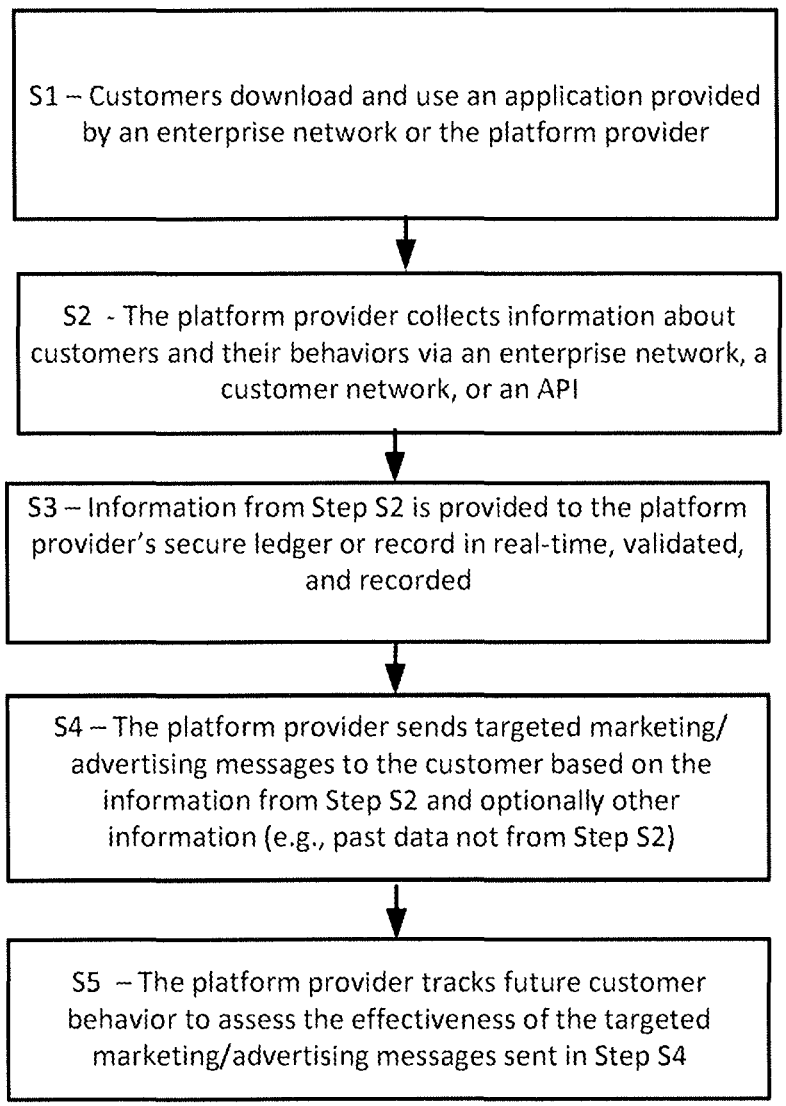
FIG. 8 illustrates a first example of a marketing data analytics platform.

Example 7: Secure Ledger or Record Based Marketing/Advertising Distribution Platform In Example 7, the platform provider 100 has technology embedded in one or more mobile applications or other computing devices. For example, the technology may be embedded through an API or other third-party application. By embedding technology in a third-party application (e.g., an application of one of the enterprise network), the platform provider may leverage the brand equity of a known enterprise network. In another example, the platform provider 100 may have its own application or other interface that allows an enterprise network to access the secure ledger or record or another enterprise network's information directly (given the appropriate permissions are obtained). The enterprise networks 101 in the common network 1000 include Grocery Retailer "C" and Smartphone Mapping Company "D." The term "retailer" is used as an example, but the enterprise networks 101 may include companies that are not retailers (e.g., consumer packaged goods companies, advertisers, technology providers, etc.). Referring to FIG. 8, in step S1, customers download and use the Smartphone Mapping Company "D" mobile application. Alternatively, the customers may download the platform provider's mobile application. In Step S2, the platform provider 100 collects information about customers and their behaviors (e.g., social media activity, articles and/or advertisements viewed, webpages visited, apps downloaded or used, goods or services viewed or purchased, the customer's location, places the customer visits, demographics, etc.) through its technology in the application directly from the customer network 102, directly from the enterprise network 101, or from an API. In Step S3, the information about the customers and their behaviors are tracked, verified, and recorded in the platform provider's secure ledger or record, which may or may not include a private blockchain. For purposes of discussion, the secure ledger or record will be referred to as a private blockchain, but any other secure ledger or record may be used instead of the private blockchain. In some aspects, the recorded information is leveraged using machine-learning algorithms and/or artificial intelligence configured to determine how/when a marketing message will be effective for a given customer or group of customers. In Step S4, based on the recorded customer behavior, the platform provider 100 may then send targeted marketing/advertising messages on behalf of the Grocery Retailer "C" through the Smartphone Mapping Company "D" application via the customer network 102. For example, if that platform provider 100 determines that a customer is near his or her usual Grocery Retailer "C" and/or establishes a pattern of when the customer may be likely to buy groceries, the platform provider 100 can send a marketing message and/or prompt a third party to send a marketing message to that customer in real-time. In Step S5, the platform provider 100 can then track the results (whether the advertisement was effective and resulted in the desired customer action (e.g., a purchase)), assess the return on investment (ROI) and/or other metrics that track marketing effectiveness, and settle the redeemed incentive across all parties in real-time using the blockchain. The subsequent actual results can then be fed back into the platform provider's platform for use in future assessments. Assessing the ROI may include assessing a probability (e.g., a percentage, a score, a grade, a range, a rating, or other suitable value) that the targeted advertisement will result in the customer taking a predetermined action.

In Example 7, the platform provider may send marketing/advertising to customers at optimal times, at optimal places, and/or under other optimal conditions, based on data patterns observed by the platform provider. For example, past purchase behaviors, geolocation, time/date, or other attributes may be used for targeting, and the platform provider may assess a return on investment if the advertisement is clicked or redeemed. Certain conventional systems do not allow for tracking such data patterns across networks, and are not able to optimize transmission of content (e.g., marketing/advertising) accordingly. The features described herein can provide for such tracking and optimizing by, for example, leveraging the platform provider 100 to maintain a secure ledger, and by connecting multiple enterprise networks 101 to the platform provider 100. Benefits of the system/process described in Example 7 include more effective targeting, which may result in more sales and activity, the ability to link actions and advertisements, the ability to better measure and/or increase a return on investment and/or marketing effectiveness, and the ability to provide a better customer experience by individualizing and/or optimizing the targeting of a customer or a group of customers.

Example 8: Secure Ledger or Record Based Marketing Data/Analytics

Figure 9:
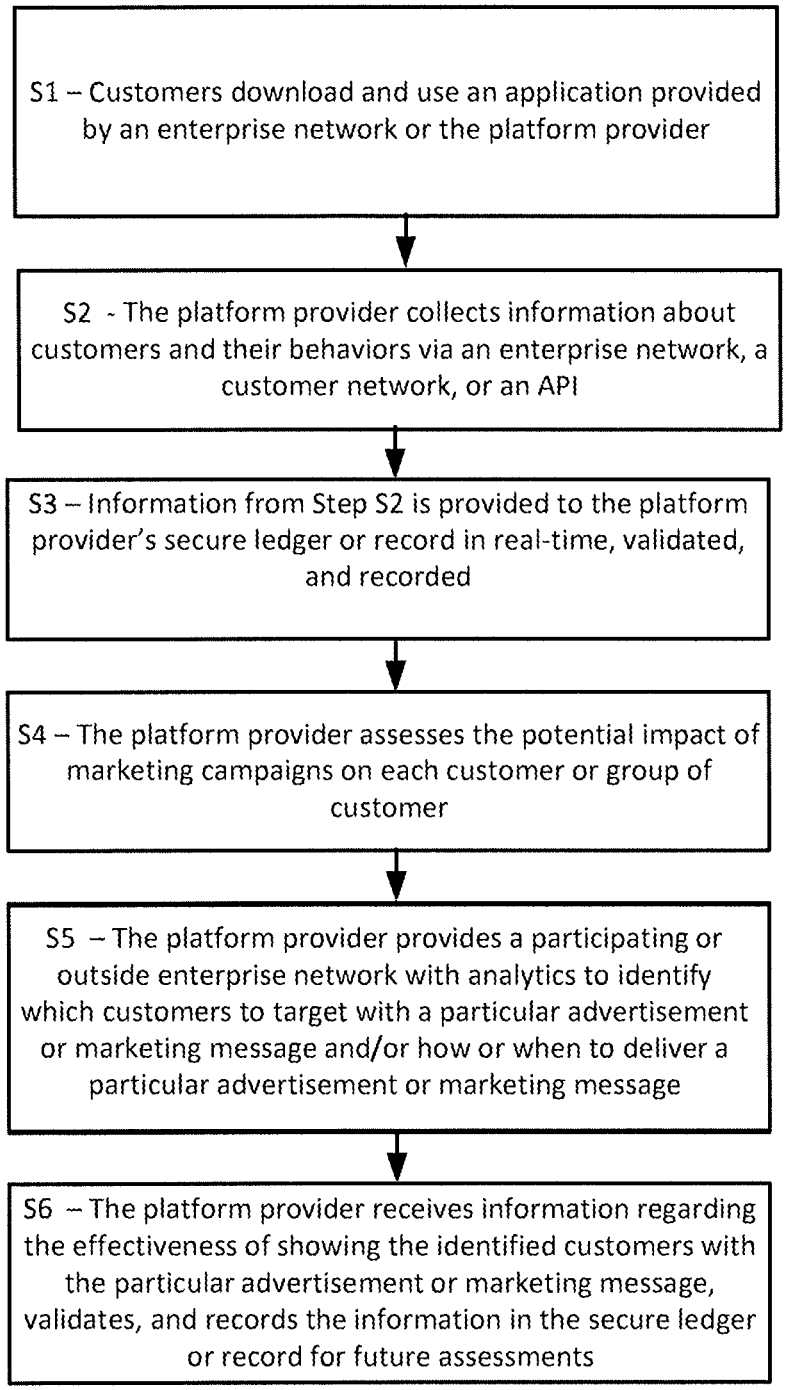
FIG. 9 illustrates a second example of a marketing data analytics platform.

The platform provider 100 manages a mobile application in which the platform provider's technology is embedded. For example, the technology may be embedded through an API or other third-party application. By embedding technology in a third-party application (e.g., an application of one of the enterprise network), the platform provider may leverage the brand equity of a known enterprise network. In another example, the platform provider 100 may have its own application or other interface that allows an enterprise network to access the secure ledger or record or another enterprise network's information directly (given the appropriate permissions are obtained). Referring to FIG. 9, in step S1, customers download and use the application (e.g., a third-party application provided by an enterprise network). In Step S2, the platform provider 100 collects information about the customers and their behaviors, which may include social media activity, articles and/or advertisements viewed, webpages visited, apps downloaded or used, goods or services viewed or purchased, the customer's location, places the customer visits, demographics, etc. via the customer network(s) 102. In Step S3, the information about the customers and their behaviors is tracked, verified, and recorded in the platform provider's secure ledger or record, which may or may not include a private blockchain. For purposes of discussion, the secure ledger or record will be referred to as a private blockchain, but any other secure ledger or record may be used instead of the private blockchain. In Step S4, the recorded information is leveraged using machine-learning algorithms and/or artificial intelligence configured to make proprietary assessments about the potential impact of marketing campaigns or other communications on a customer or group of customers. For example, a proprietary assessment may include determining the likelihood of the customer performing a desired action (e.g., opening and/or reading and/or taking another predetermined action) upon receiving various types of marketing, incentives, or other communications. The propriety assessment may include assessing a probability (e.g., a percentage, a score, a grade, a range, a rating, or other suitable value) that the targeted advertisement or communication will result in the customer taking the desired action. The platform provider 100 is uniquely positioned to collect data and make assessments that individual merchants or advertisers would not be able to do themselves. For example, based on a customer's transactional behaviors, movements, demographics, social media usage, and other information, the platform provider 100 is able to uniquely determine if/how/when a particular customer may be more responsive to a specific type of in-app advertising. In Step S5, the platform provider then provides a participating enterprise network 101 or an outside enterprise network 103 with analytics to identify which customers to target with a particular message, at what time, in what place, in what format, and/or under what other conditions, and the expected effectiveness of such campaigns. In Step S6, the subsequent actual results are then fed back into the platform provider's platform for use in future assessments. The platform provider may facilitate the distribution of marketing messages directly or indirectly.

In Example 8, the platform provider may provide analytics/insights on targeting such as which customers would be more or less receptive to marketing messages based on various factors such as time, location, etc. For example, social media and other information collected by the platform provider during the enrollment process may be used to assess the likelihood of a customer opening/taking action on a push notification. Certain conventional systems do not allow for tracking such data patterns across networks, and are not able to optimize transmission of content (e.g., marketing/advertising) accordingly. The features described herein can provide for such tracking and optimizing by, for example, leveraging the platform provider 100 to maintain a secure ledger, and by connecting multiple enterprise networks 101 to the platform provider 100. Benefits of the system/process described in Example 8 include more effective targeting, which may result in more sales and activity, the ability to link actions and advertisements, the ability to better measure and/or increase marketing effectiveness, and the ability to provide a better customer experience by optimizing the targeting of a customer or a group of customers.

In each of Examples 7 and 8 discussed above, the use of the platform provider's private blockchain allows for the secure review and recordation of customer information including customer activity/behaviors within and across a multi-merchant/party network that offers new/better insights into customer behaviors. The platform provider 100 is uniquely positioned to access and assess information from a plurality of sources (companies), resulting in an advantaged ability to determine marketing effectiveness. The platform provider 100 may also facilitate the delivery of marketing, using its technology, based on this or other information. The platform provider may also embed machine learning/artificial intelligence algorithms within the blockchain, or as a separate system in communication with the blockchain. This results in an improved ability to target/reach customers with marketing/messaging, and improved return on investment for marketing and advertising.

By allowing enterprise networks from the same industry or different industries to contribute customer information, and/or by allowing participating networks and/or outside networks to contribute customer information, the platform provider is able to assess a wider spectrum of behavior, consumer segments, and transactions. The increased sample size, scope, and breath of contents in the compiled customer information creates a better result for decisions related to targeted advertising and marketing.

In any of the examples described above that refer to a "mobile application," one of ordinary skill in the art would understand that another interface may be used instead of a mobile application. In some examples, the another interface may include, but is not limited to, a browser on a computer, laptop, tablet, cellular phone or other communication device; a computer interface; a software application on a device that is not a mobile device; etc.

In any of the examples described above, the platform provider may or may not be directly compensated for facilitating the process. In some examples, the platform provider may get compensated for its services in the form of incentives or fees (e.g., a fixed fee, per transaction fee, value-based fee, etc.). Information about such platform provider compensation, may also be received, validated, and recorded in the secure ledger or record.

In any of the examples described above, the platform provider may use artificial intelligence and/or machine learning and/or other algorithms to increase the effectiveness of any decisions or assessments made in the process.

The hardware and data processing components used to implement the various processes, operations, illustrative logics, logical blocks, modules and circuits described in connection with the embodiments disclosed herein may be implemented or performed with a programmed computer programmed with software stored in a non-transitory or transitory memory to accomplish the tasks described above, a general purpose single- or multi-chip processor, a server, a digital signal processor (DSP), an application specific integrated circuit (ASIC), a field programmable gate array (FPGA), or other programmable logic device, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a circuit and includes computer code for executing (e.g., by the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods can be accomplished with standard programming techniques with rule-based logic and other logic to accomplish the various connection steps, processing steps, comparison steps, and decision steps. One or more features of the examples or implementations described above may be combined with one or more features of another example or implementation described above.

What is claimed:

1. A method of providing fraud protection comprising:
receiving, by a platform provider comprising one or more processors and memory, from a first enterprise network of a plurality of enterprise networks in direct communication with the platform provider, information regarding an enrollment request or a transaction request, the information including transaction information or customer information;
generating, by the platform provider, based on the information, a probability that the enrollment request or the transaction request is fraudulent;
validating, by the platform provider, the information and the probability using a consensus protocol;
encrypting, by the platform provider, the information and the probability; and
recording, by the platform provider, the information and the probability as one or more blocks in a private blockchain.

2. The method of claim 1, further comprising providing, by the platform provider, to the first enterprise network, the probability that the enrollment request or the transaction request is fraudulent.

3. The method of claim 1, further comprising:
receiving, by the platform provider, additional information from the first enterprise network that indicates the enrollment request or the transaction request is fraudulent; and
recording, by the platform provider, the additional information in one or more second blocks of the private blockchain.

4. The method of claim 1, wherein the probability is generated using artificial intelligence or machine learning.

5. The method of claim 1, wherein the transaction information comprises one or more of a location, an amount, or a time of a transaction.

6. The method of claim 1, wherein the customer information comprises one or more of a name, an address, a telephone number, a credit card number, a payment account number, a social security number, a driver's license or state identification number, an internet protocol (IP) address, a subscriber identity module (SIM) number, loyalty account information, a credit history, past enrollment or transaction history, or a bank account number.

7. The method of claim 1, wherein each of the plurality of enterprise networks are in communication with one another.

8. The method of claim 1, wherein each of the plurality of enterprise networks are restricted from communicating with one another.

9. The method of claim 1, further comprising receiving, by the platform provider, a request from the first enterprise network to remediate a position relative to the first enterprise network.

10. The method of claim 1, wherein the probability is generated further based on past behavior associated with the customer information.

* * * * *